(12) United States Patent
Woods et al.

(10) Patent No.: US 9,069,764 B2
(45) Date of Patent: Jun. 30, 2015

(54) SYSTEMS AND METHODS FOR FACILITATING COMMUNICATION BETWEEN USERS RECEIVING A COMMON MEDIA ASSET

(71) Applicant: United Video Properties, Inc., Santa Clara, CA (US)

(72) Inventors: Thomas Woods, Arlington Heights, IL (US); Brian Fife, Concord, MA (US); Kourosh Soroushian, San Diego, CA (US)

(73) Assignee: Rovi Guides, Inc., Santa Clara, CA (US)

( * ) Notice: Subject to any disclaimer, the term of this patent is extended or adjusted under 35 U.S.C. 154(b) by 0 days.

(21) Appl. No.: 13/622,563

(22) Filed: Sep. 19, 2012

(65) Prior Publication Data

US 2014/0081988 A1 Mar. 20, 2014

(51) Int. Cl.
*G06F 17/30* (2006.01)
(52) U.S. Cl.
CPC ..................................... *G06F 17/30* (2013.01)
(58) Field of Classification Search
CPC .............. G06F 17/30035; G06F 17/30; G06F 17/30699
USPC .................... 707/748, 913, 922, 769; 463/42
See application file for complete search history.

(56) References Cited

U.S. PATENT DOCUMENTS

| | | | |
|---|---|---|---|
| 2007/0218997 A1* | 9/2007 | Cho ................................ | 463/42 |
| 2009/0291761 A1* | 11/2009 | Hata .............................. | 463/42 |
| 2013/0035161 A1* | 2/2013 | Layne, IV ....................... | 463/31 |
| 2013/0123018 A1* | 5/2013 | Sareli et al. ..................... | 463/42 |
| 2013/0123019 A1* | 5/2013 | Sullivan et al. ................ | 463/42 |
| 2013/0147906 A1* | 6/2013 | Weiser et al. ............. | 348/14.09 |
| 2013/0151623 A1* | 6/2013 | Weiser et al. ................. | 709/205 |

* cited by examiner

*Primary Examiner* — Phong Nguyen
(74) *Attorney, Agent, or Firm* — Ropes & Gray LLP

(57) ABSTRACT

Methods and systems are described herein for providing a media guidance application that identifies users accessing the same media asset, determines which users desire to communicate with each other, and provides an asset-integrated notification to each of the users desiring to communicate, facilitating communication between the users. For example, other users with a desire to communicate with an initial user that are accessing the same media asset as the initial user may be indicated by inserting a media element representative of the other users directly into the media asset watched by an initial user.

20 Claims, 14 Drawing Sheets

600

610

900

| TRANSMISSION FILE |
|---|
| 902 — `<USER_EQUIPMENT_TRANSMISSION>` |
| 904 —     `<ASSET_DETAILS>` |
| 906 —         `<CURRENT_ASSET>` BASEBALL_GAME `</CURRENT_ASSET>` |
| 908 —         `<ASSET_RUNTIME>` 1:40:34 `</ASSET_RUNTIME>` |
| 910 —         `<ASSET_DATETIME>` 06-08-12_6:43:01 `</ASSET_DATETIME>` |
| 912 —     `</ASSET_DETAILS>` |
| 914 —     `<USER_DETAILS>` |
| 916 —         `<USER_NAME>` JOHN SMITH `</USER_NAME>` |
| 918 —         `<USER_PROFILE_ID>` A1234567 `</USER_PROFILE_ID>` |
| 920 —         `<SILENT_MODE>` OFF `</SILENT_MODE>` |
| 922 —     `</USER_DETAILS>` |
| 924 — `</USER_EQUIPMENT_TRANSMISSION>` |

FIG. 9

SYSTEMS AND METHODS FOR FACILITATING COMMUNICATION BETWEEN USERS RECEIVING A COMMON MEDIA ASSET

BACKGROUND OF THE INVENTION

Many people enjoy watching media assets such as movies, television programs and webcasts with other people. Physically watching a media asset together allows the viewers to communicate or chat about the program as it progresses. Unfortunately, traveling to other locations, for example, a friend's residence, lounge or restaurant, to enjoy a media asset is often undesirable, due to the time and effort required to travel. Moreover, many users prefer to watch media assets in the comfort of their own home.

In addition, with the advent of video streaming services and the increased use of DVR technology, users may watch the same media asset at different times. Therefore, in order to coordinate remote viewing, a user must notify other users of the name of the media asset and the time the user will begin watching. However, the user must also actively provide updates to the other users (e.g., if the user changes to a different media asset, or if the user disrupts the playback of the media asset by pausing, fast-forwarding, or rewinding the media asset). Therefore, relying on a user to coordinate with other users to view a media asset is an ineffective way to facilitate communication between users currently watching a program.

SUMMARY OF INVENTION

Accordingly, methods and systems are described herein for providing a media guidance application that identifies users accessing the same media asset, determines which users desire to communicate with each other, and provides an asset-integrated notification to each of the users desiring to communicate, which facilitates communication between the users. Specifically, a user accessing a media asset may have a media element, which represents another user currently viewing the same media asset, inserted directly in the media asset accessed by the user.

In some embodiments, the media guidance application may retrieve metadata indicating that an initial user is accessing a particular media asset. The media guidance application may retrieve and process user profile information associated with the initial user to determine whether or not the initial user desires, or is likely to desire, to communicate with another user viewing the same media asset. Upon determining that the initial user and the other user desire to communicate (e.g., based on a comparison of each users' user profile), the media guidance application may insert a multimedia graphic (e.g., using croma key compositing, commonly known as "green screening"), representing the other user, directly into the media asset viewed by the initial user. In some embodiments, to prevent the initial user from being distracted, the media guidance application may replace or substitute a background entity such as a movie extra or member of a crowd or audience appearing in the media asset accessed by the initial user with the media element representation of the other user. Upon seeing the representation of the other user in the background of the media asset, the initial user may initiate communication with the other user.

For example, the media guidance application may determine that a first user and a second user are both viewing the same movie. The media guidance application may also determine the second user is a friend of the first user based on information provided by a social networking source (e.g., the users' relationship status) as indicated by each user's respective user profile. The media guidance application may then replace an extra in the background of the movie, as shown on the first user's user equipment, with an image of the second user. Seeing the second user in the background of the movie, the first user will know that the second user is currently watching the same movie. The first user may then initiate communication with the second user (e.g., via chat features incorporated into the media guidance application).

In another example, the media guidance application may replace members of a crowd or audience in a sports broadcast or game show with users desiring to communicate with each other. For example, the media guidance application may determine that a first user and a second user are both viewing the same baseball game on first and second user equipment, respectively. The media guidance application may also determine the second user is a friend of the first user and replace a member of a crowd of the baseball game, as shown on the first user's user equipment, with an image of the second user. Upon viewing the second user in the crowd of the baseball game, the first user may communicate with the second user (e.g., via chat features, audio components of each users' user equipment, telephone calls, etc.).

In some embodiments, the media guidance application may present the baseball game from a single viewpoint on the first and second user equipment. For example, the media guidance application may present the baseball game from a single camera view from which members of the crowd are visible (e.g., behind members of the crowd looking out at the baseball game). In some embodiments, audio communication may occur through the first and second user equipment, imitating a scenario where the first and second users are seated next to each other viewing the media asset live and in person together.

In some embodiments, a user may be watching a program (e.g., a baseball game or game show), and the media guidance application may process metadata received from the user equipment to identify the media asset and to determine the user's point of progress within the playback of the media asset. The media guidance application may use this information to determine other users also accessing the media asset and currently at the same point of progress within the playback of the media asset, reducing the chance that one user may spoil the events of the media asset as the users communicate.

In some embodiments, the media guidance application may also process metadata received from either a user equipment or media asset source to determine regions or portions of the media asset, as displayed on the user's equipment, that are suitable for receiving inserts of media elements representative of other users (e.g., via tags or chroma keyed compositing transmitted with the media asset). In some embodiments, the media guidance application may use object recognition to differentiate between characters in the foreground and background as the media asset progresses. For example, during periodic pans of the crowd, the first user may be alerted to other users also watching the same program as the other users appear in the crowd.

In some embodiments, the media guidance application may retrieve a user profile from each user accessing a common media asset. The user profile may include traits, links to other applications, chat histories, or other information that may be indicia of a desire to communicate with each other. The media guidance application may use this information to determine the other users that appear on a particular user's display of the media asset. In some embodiments, the media guidance application may also use this information to rank or order the placement or display of inserts including media elements representative of other users in the media asset being accessed on the first user equipment.

In some embodiments, the user profile retrieved from each user, either located on a remote server or the user's user equipment, may include additional information used to generate the media element representative of the user. For example, in some embodiments, the user equipment may generate a real-time image of the user as the user accesses the media asset. In another example, the media guidance application may retrieve a multimedia graphic for use as the media element from the user profile.

It should be noted, the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 9 shows an exemplary data structure for a transmission file associated with a media asset in accordance with some embodiments of the disclosure;

DETAILED DESCRIPTION

Figure 1:
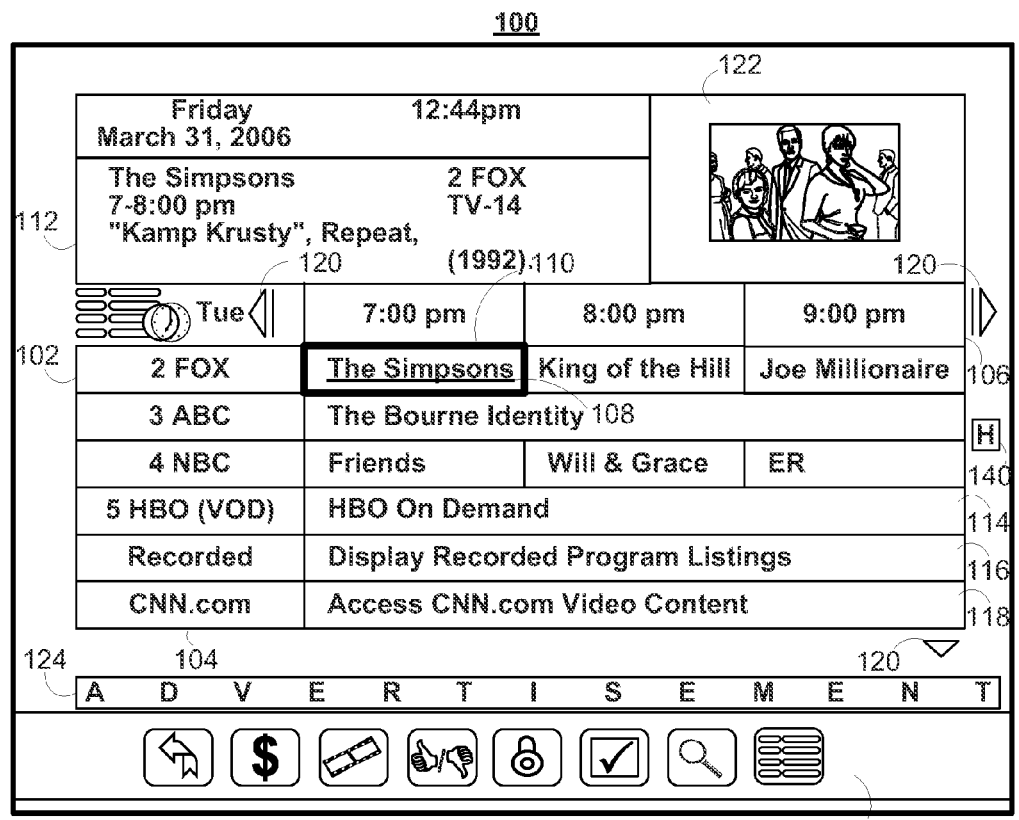
FIG. 1 shows an illustrative media guidance application that may be used to display media content listings in accordance with some embodiments of the disclosure.

Methods and systems are described herein for providing a media guidance application that identifies users accessing the same media asset, determines which users desire to communicate with each other, and provides an asset-integrated notification to each of the users desiring to communicate, facilitating communication between the users.

In some embodiments, the media guidance application may process data to determine the media asset currently being accessed by each user's user equipment, and the point of progress of the user in the playback of the media asset. Data associated with the media asset and received by the media guidance application may describe the current state of the media asset (e.g., the particular media asset currently accessed by the respective user equipment, the point of progress of the user in the playback of the media asset, and/or the particular portions corresponding to different entities, such as characters appearing in the media asset, etc.) or user (e.g., the appearance of the user, the interests of the user, the user's desire to communicate with other users, etc.).

In some embodiments, the data may include information received from other sources, recent news, internet postings, recommendations, observations, compilations or correlations of data derived from one or more sources. For example, data may include status updates, blog posts, comments, or chat histories retrieved from a remote server or social networking website. In some embodiments, the data may be received from the same source as the media content and/or the media guidance application. In some embodiments, the data may be received from different sources than the media content and/or the media guidance application. For example, the data may be received from a content source (e.g., content source 416 (FIG. 4)) or a media guidance source (e.g., media guidance source 418 (FIG. 4)). In some embodiments, the data may be received by the same or a different source as the media asset or media guidance data used by the media guidance application.

The media guidance application may also receive data regarding the identity of one or more users viewing a media asset from one or more user equipment devices. For example, the media guidance application may receive user input identifying a user. In some embodiments, the media guidance application may retrieve data associated with the one or more user equipment devices (e.g., the name of the user registered to the user equipment). In some embodiments, the media guidance application may automatically detect the particular user accessing the user equipment.

In some embodiments, intelligent detection systems may be used to input information into the media guidance application without user input. Intelligent detection systems may include, but are not limited to, user proximity detection (e.g., detecting particular users that are within viewing distance of the user equipment accessing the media asset), remote identification of users (e.g., detecting personal identifiers, such as passwords, access codes, electronic signatures, keycards, which are registered to a person), or remote identification of devices, which indicate a user is present (e.g., identifying that a smartphone registered to a particular user is within a proximity suggests that the user is within the same proximity). Furthermore, intelligent detection systems may, based on the time of day (e.g., via applications incorporating time and date information), direct the media guidance application (e.g., via control circuitry 304 (FIG. 3)) to automatically determine the particular users viewing the media asset.

The media guidance application may retrieve and process user profile information associated with each user to determine whether or not particular users desire to communicate. In some embodiments, the user profile may comprise one or more arrays or data structures including data fields. The data fields may be associated with user interests (e.g., favorite genres, series, episodes, products, traits, critical reviews, teams, etc.), chat histories (e.g., lists of other users the user has previously communicated with via the media guidance application), links to social media, website, or mobile application accounts (e.g., buddy/friend lists, groups, recent postings, or other information accessible via a social media network), or any other data indicating a user wishes (or does not wish) to communicate with one or more, either known or unknown, other users.

Any of the information found in the user profile, or a combination thereof may comprise indicia of a desire to communicate. As used herein, "indicia" of a desire to communicate, whether in relation to one or more users, refers to any indication used by the media guidance application to determine that one or more users likely desire to communicate with each other. Furthermore, the data fields may contain numerical values (e.g., the data fields could be expressed in binary or any other suitable code or programming language).

In some embodiments, the media guidance application may compute a likelihood of users desiring to communicate or rank the desire of users to communicate with each other (e.g., an initial user and another users desire to communicate about a commonly accessed asset). In some embodiments, the media guidance application may also use the likelihood or rank to adjust the placement of inserts including media elements representative of each of the other users in the media asset being accessed by an initial user on the initial user's user equipment. For example, as discussed in depth in relation to FIGS. 11 and 12, the media guidance application may compare information in one user profile to another user profile or information stored in a data structure to determine the desirability of communication between two users.

To compare the information, the media guidance application may use multiple types of object recognition, including fuzzy logic. For example, the particular information may be found in a data field that may be a textual data field. Using fuzzy logic, the system may determine two fields to be identical (or different) even though the substance of the data field (e.g., two different spellings) is not identical. Other suitable methods for comparing data are also contemplated by this disclosure.

In some embodiments, a user may be able to select another user with which to communicate. The user may make the selection through an on-screen interface or through the user of a second screen device as discussed below. In some embodiments, a user may select a media element representative of a user, which appears in the media asset. Communication from the user may then be directed at the user corresponding to the media element. In some embodiments, a user may access a list of all users available for communication and select a user to with communicate from the list. In some embodiments, communication may automatically be triggered. For example, pre-selected options (e.g., selectable options 202, 204, 206, 208, 210, 212, and 214 (FIG. 2)) included in a user profile or enabled on user equipment may automatically initiate communication. In some embodiments, a user may select that communicate should be enabled for, or media elements representing other users are viewing the media element should be inserted for, other users within a specific geographical area (e.g., within the user's residence).

In some embodiments, the media guidance application may modify or overlay the media asset as displayed on a user's equipment by inserting a media element. As used herein, a "media element" refers to any display object, audio signal, or multimedia asset transmitted to a first user that represents a second user who is accessing the same media asset as the first user. The media element may comprise any audio or visual indication. For example, a media element may include, but is not limited to, texts, graphics, images, video, audio, or other alerts or indications. In some embodiments, the media element may be inserted into the media asset.

For example, a graphic, image, audio component or video component may be inserted into a media asset via any suitable means. Throughout this disclosure "inserting" as referred to inserting a media element into a media asset may include replacing or substituting (e.g., via croma keyed compositing) a media element at an identified portion, or overlaying a media element onto an identified portion. For example, the media guidance application may insert media element into a portion, which includes an actor, a movie extra, or member of the crowd or audience in the media asset with a chroma keyed graphic of the user. The chroma keyed graphic may be pre-rendered or render in real-time by the user's user equipment. For example, the graphic may be generated via a camera included in the user's user equipment. Furthermore, in some embodiments, a user may use various image and/or content capture devices, such as camcorders, digital cameras with video mode, audio recorders, mobile phones, and handheld computing devices, to record content or to capture media elements representative of a user for insertion into a media element.

In some embodiments, the media guidance application may highlight a particular media element. Highlighting may include any indication in the media asset that alerts a user to the fact that the media element represents another user accessing the media asset. In some embodiments, the media guidance application may highlight a particular entity in the media asset in preparation for inserting a media element. Highlighting may include boxing, bolding, enlarging, changing the color, or otherwise graphically altering the media element. In addition, multimedia indications may also be used. Also, in some embodiments, the media guidance application may not highlight the media element, or may provide an option to select or highlight the media element.

The media guidance application may insert a media element representative of another user into a portion of a media asset including an entity. As used herein, an "entity" refers to any object appearing within the display of a media asset as presented on user equipment, which may be edited or removed. For example, in some embodiments, a entity may refer to an extra (e.g., a performer in a film, television show, or other production, who appears in a nonspeaking, nonsinging or nondancing capacity, usually in the background). In another example, an entity may appear as a person appearing in the background of a media asset (e.g., a member of the crowd or audience at the live performance of a media asset, or a passerby in the background during a recording unassociated with the production). In another example, an entity may refer to empty space (e.g., an unfilled seat in the crowd of a televised sporting event) appearing in the background of a media asset. In another example, an entity may be a main character of the media asset or any other person or object appearing in the media asset.

In some embodiments, a entity may include the audio of the media asset. For example, the media guidance application may alert a first user that a second user is also watching a media asset by inserting a media element including an audio cue (e.g., sound track, theme song, voice announcement, or other audio signal associated with the second user) into the audio track of the media asset. In some embodiments, the audio cue may be retrieved from a user profile of a user or obtained in real-time from the user's user equipment.

The media guidance application may determine the portion of the media asset that includes an entity via real-time data or metadata. The media guidance application may insert and adjust the media element as the media asset progresses. In some embodiments, the media element may be adjusted as the media asset progresses as described in relation to FIG. 13 below. As used herein, "adjusting" a media element as the media asset progresses refers to modifying the size, shape, position, orientation, or other characteristic of the media element to correspond with an size, shape, position, orientation, or other characteristic of an entity during the progression of the media asset. For example, if an entity (e.g., a background character in a movie) moves from once side of the screen to the other in the background of the movie, the media element is modified to move from one side of the screen to the other. Furthermore, the media element may change its size, shape, position, orientation, or other characteristic to maintain perspective (e.g., reducing the size of the media element as the media element is moved further into the background, corresponding to the movement of the associated entity).

In some embodiments, adjusting a media element may include selecting a mew media element to appear in each frame of a media asset. Additional disclosure regarding the selection and insertion of media elements in a media asset, including discussion of selecting and determining appropriate portions and/or objects of the media asset is disclosed in Klappert, U.S. Patent App. Pub. No. 2012/0059953, published Mar. 8, 2012, which is hereby incorporated in its entirety into this disclosure.

In some embodiments, where the media element comprises audio cues, the media guidance application may determine the appropriate insertion point via real-time data or metadata. For example, the media guidance application may process the real-time data or metadata to identify a break in the audio output of the media asset (e.g., the end of background music, a pause in the conversation of characters appearing in the media asset, the conclusion of a laugh track, or the end of a scene). In some embodiments, the media guidance application may measure the decibel level of the audio output and insert the audio cue when the decibel level reaches a particular threshold. In some embodiments, the media guidance application may insert the audio cue upon detecting another user is accessing the same media asset as the initial user.

The media guidance application may receive requests from a user to communicate with another user accessing a common media asset. The media guidance application may facilitate communication between users via transmitting and receiving messages in multiple formats (e.g., video, audio, or text). The media guidance application may also open a direct line of communication between the user equipment of each user. For example, the users may transmit audio conversation through the user equipment (e.g., via user input interface 310 (FIG. 3)) and receive audio (e.g., via speakers 314 (FIG. 3)) through the user equipment. In some embodiments, the media guidance application may include additional communication options, including but not limited to, automatically contacting other users during a pause or break (e.g., a commercial interruption) in the media asset, or presenting communication on multiple user equipment devices of one user (e.g., displaying other users on second screens).

In some embodiments, the communication between users may combine multiple formats. For example, the video media element, which represents a second user, on the screen of the first user may "speak" to the first user through the audio of the user's user equipment. The video media element may be rendered in real-time to show the actions of the second user involved in speaking (e.g., the lips of the video media element move).

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may enable a user to navigate among, locate and select content. As referred to herein, the terms "media asset" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance. It should also be noted that throughout this application reference to a system or method incorporating one type of content form should be understood to be adaptable to other content forms.

In some embodiments, the media asset may appear on a display screen of, or associated with, user equipment. As referred to herein, the phrase "user equipment device," "user equipment," "user device," "electronic device," "electronic equipment," "media equipment device," or "media device" should be understood to mean any device for accessing and/or displaying the content described above, such as a television, a Smart TV, a set-top box, an integrated receiver decoder (IRD)

for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same.

In some embodiments, the user equipment device may have a front facing screen and a rear facing screen, multiple front screens, or multiple angled screens. In some embodiments, the user equipment device may have a front facing camera and/or a rear facing camera used to obtain real-time images of a user as the user accesses a media asset. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices.

In some embodiments, the media guidance application may link two devices, which act in concert to provide a single user experience. For example, in some embodiments, the media guidance application may display other users accessing the media asset on one device, while the media asset appears on another device. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
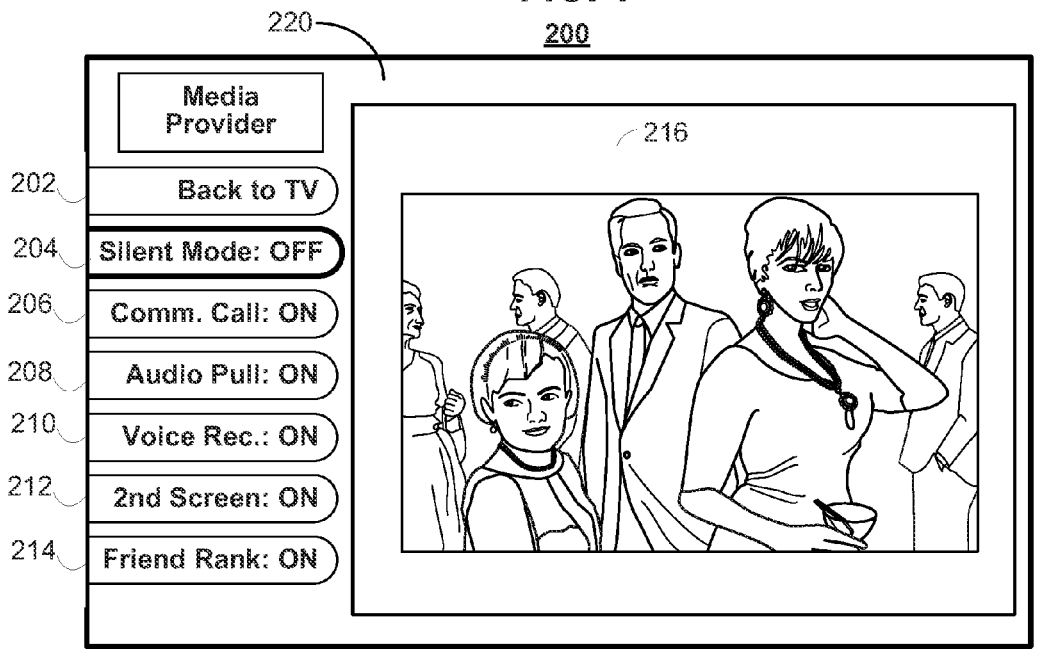
FIG. 2 shows an illustrative media guidance application that may be used to activate various features of the media guidance application in accordance with some embodiments of the disclosure.

FIGS. 1 and 2 show illustrative display screens that may be used to provide media guidance data. The display screens shown in FIGS. 1-2, 5A-D, and 6A-C may be implemented on any suitable user equipment device or platform shown or described in FIGS. 3-4. While the displays of FIGS. 1-2, 5A-D, and 6A-C are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button or a SEE MORE LISTINGS button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.) It should be noted that 30817207_530817207_5all the embodiments and processes described herein as being implemented using the guide may be implemented by the image processing application and vice versa.

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to, or be unrelated to, one or more of the content listings in grid 102. Advertisement 124 may also be for products or services related, or unrelated to, the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner-shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other display screens of the embodiments described herein or accompanying, adjacent to, or interspersed with related media content listings.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com or a particular social network, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Display 200 displays guide 220, which includes selectable options 202, 204, 206, 208, 210, 212, and 214. Selectable options 202, 204, 206, 208, 210, 212, and 214 may allow a user to select different settings for the media guidance application as disclosed below. For example, the user may indicate, using option 204, that the media guidance application should search for, and allow communication with, other users accessing the same media content. Therefore, a user would not need to return to guide 220 in order to enable communication. Toggling option 204 may prevent the media guidance application from facilitating communication with other users accessing the same media asset as the user.

Guide 220 may provide graphical images including cover art, still images from the content, video clip previews, live video from the content, or other types of content that indicate to a user the content being described by the media guidance data in the listing. Guide 220 may also include media asset 216.

Selecting option 202 may cause the media guidance application to exit guide 220. Selecting option 206 may cause the media guidance application to automatically call other users during a commercial interruption. Selecting option 208 may cause the media guidance application to automatically insert audio content from a user's profile (e.g., for replacing or supplementing the audio of the media asset to indicate another user). Selecting option 210 may cause the media guidance application to identify users based on voice recognition. Selecting option 212 may cause the media guidance application to display communication, media elements, or other users on a second user equipment device while the first user equipment device accesses the media asset. Selecting option 214 may cause the media guidance application to perform process 1100 (FIG. 11) in order to rank the other users accessing the same media asset as the user.

Figure 3:
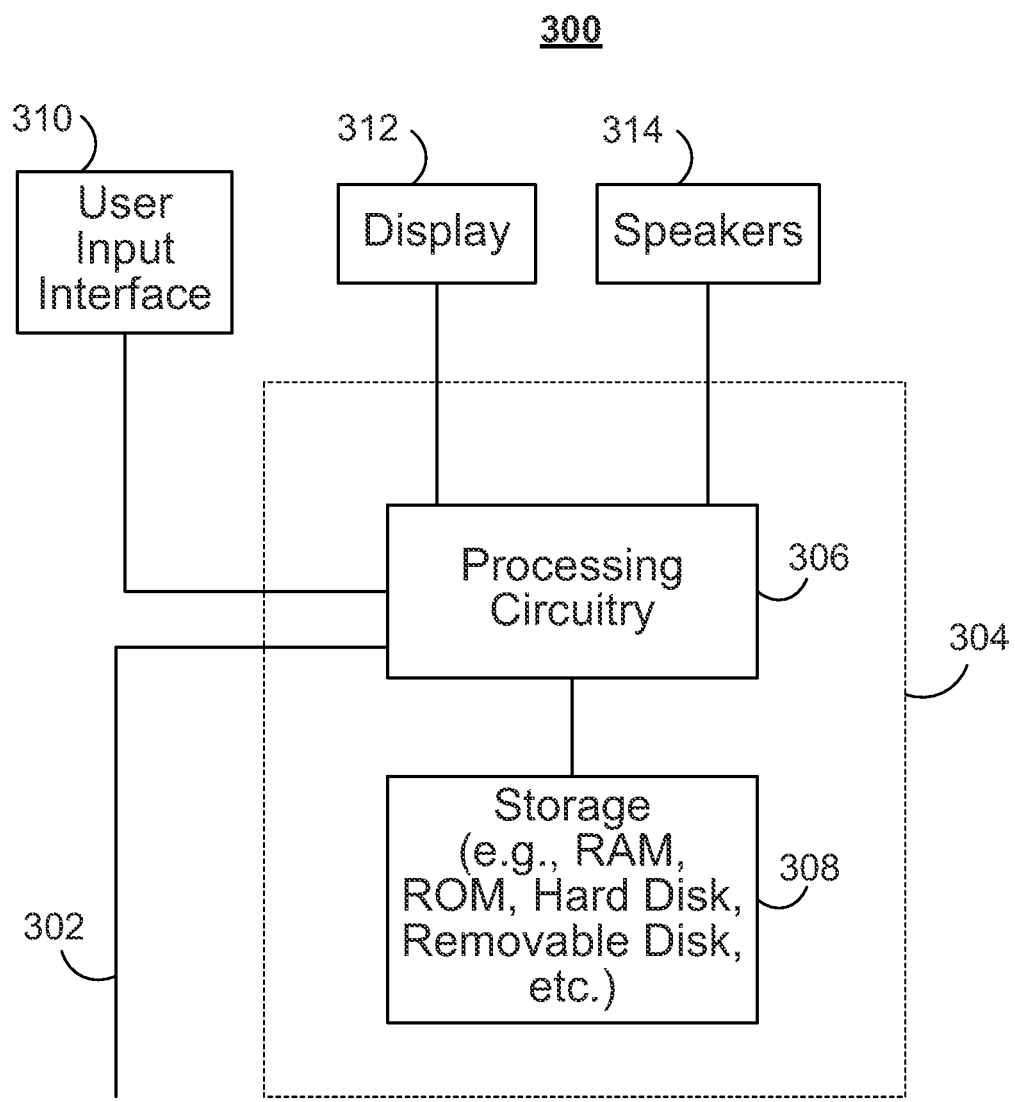
FIG. 3 is a block diagram of an illustrative user equipment device in accordance with some embodiments of the disclosure.
Figure 4:
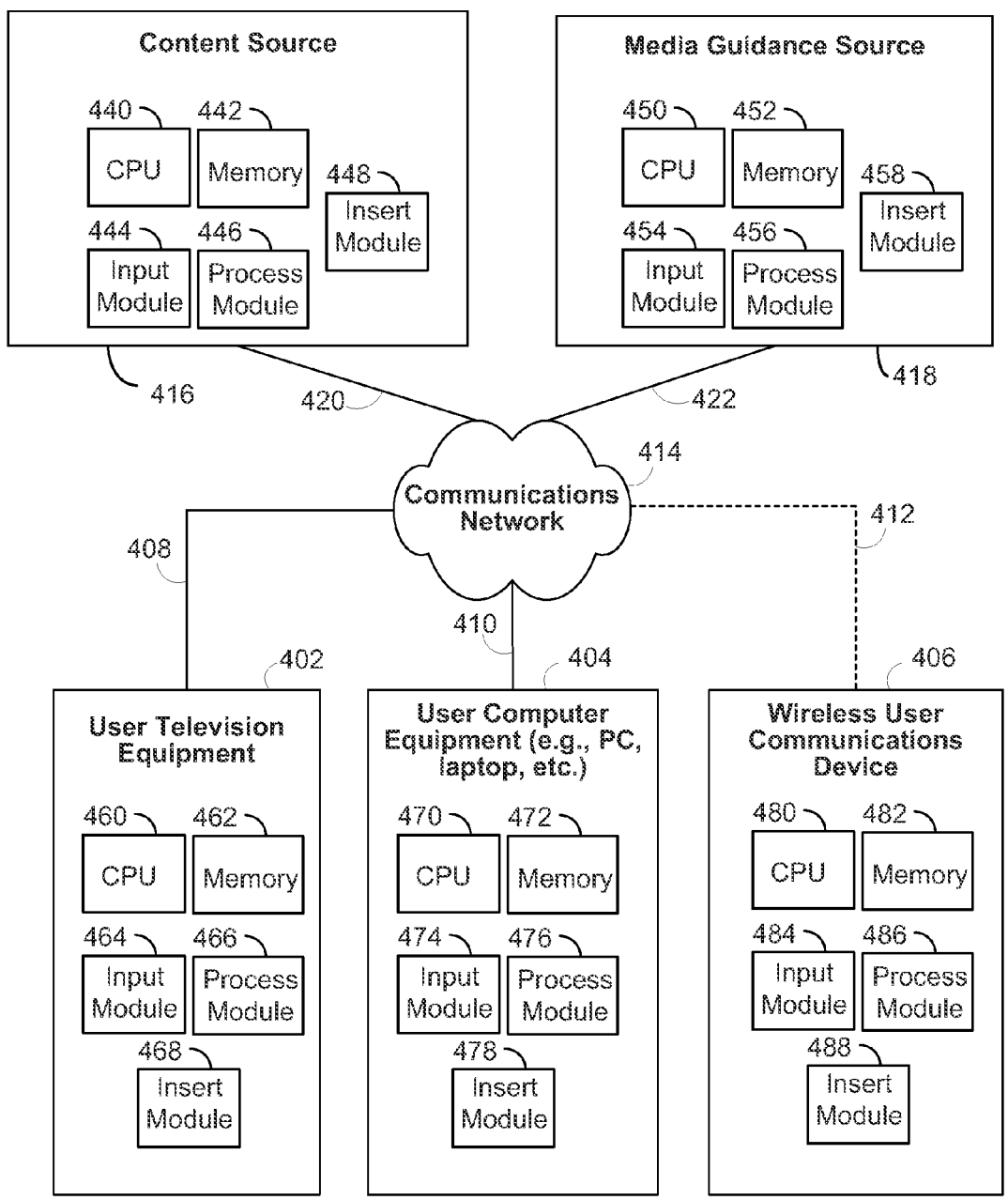
FIG. 4 is a block diagram of an illustrative media system in accordance with some embodiments of the disclosure.

In some embodiments, guide 220 may be received from media guidance source 418 (FIG. 4) and media asset 216 may be received from content source 416 (FIG. 4) via communications network 414 (FIG. 4). In some embodiments, control circuitry 304 (FIG. 3) may be used to executes commands in guide 220.

Users may access media assets and the media guidance application (and its display screens described above and below) from one or more of their user equipment devices. FIG. 3 shows a generalized embodiment of illustrative user equipment device 300. More specific implementations of user equipment devices are discussed below in connection with FIG. 4 and may be used to control or operate the media guidance application. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and, specifically, processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, a multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to facilitate communication. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server.

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions (e.g., to facilitate communication with other users) to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images.

In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304.

Figure 5A:
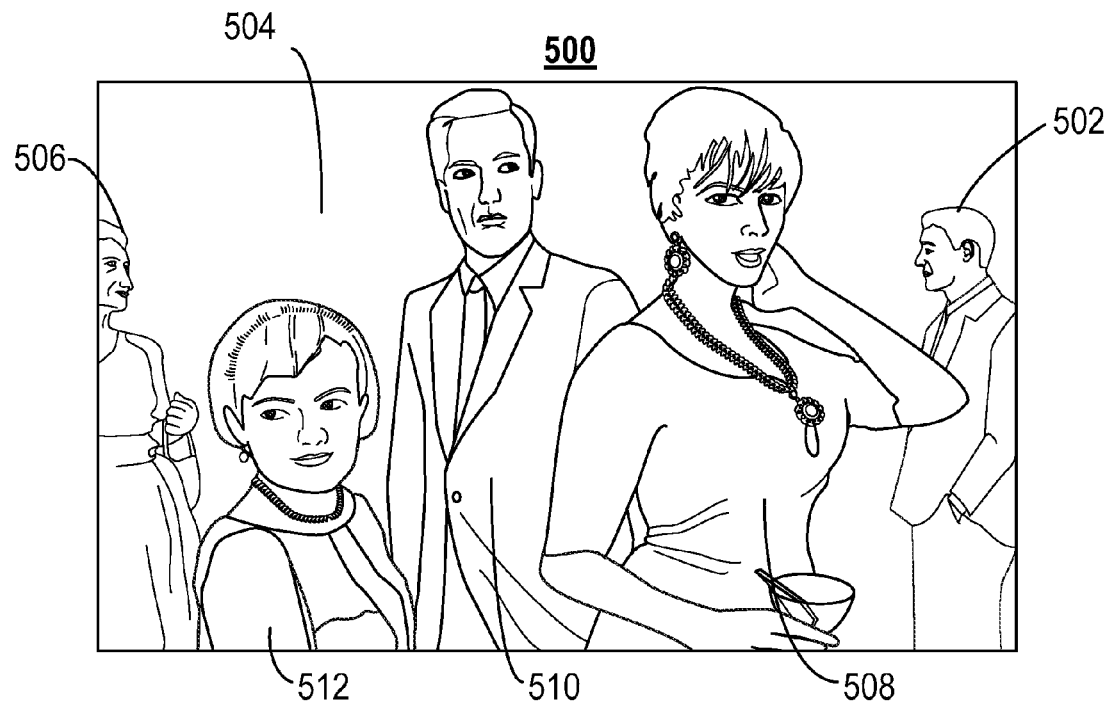
FIG. 5A shows an illustrative display of a media asset that may be used to facilitate communication in accordance with some embodiments of the disclosure.
Figure 5B:
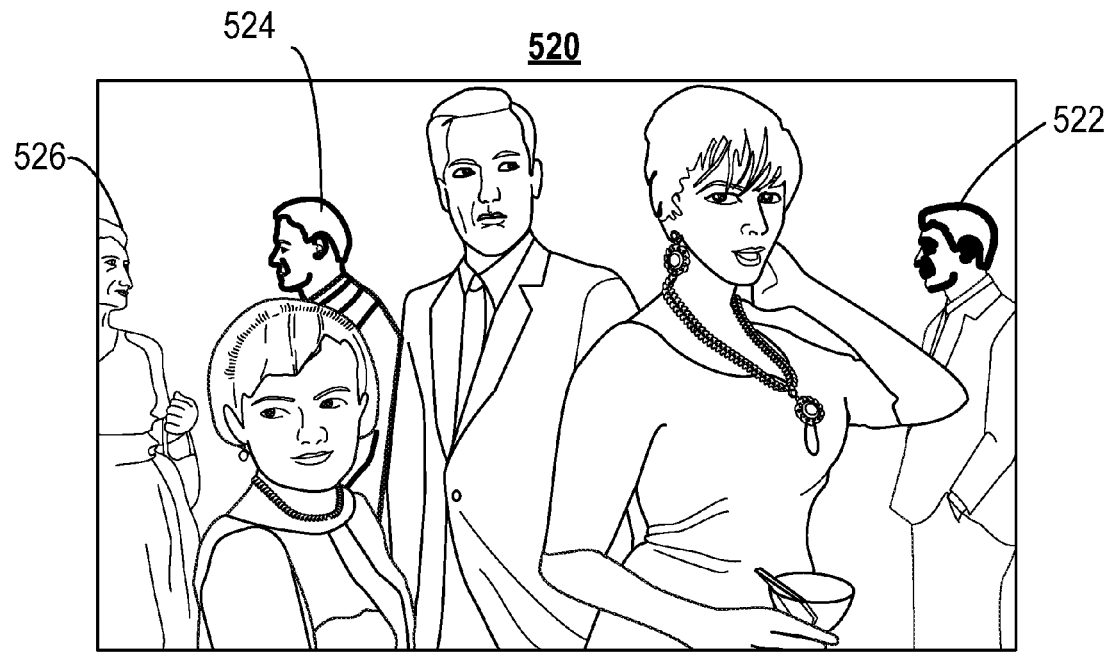
FIG. 5B shows an illustrative display of a media asset in which an entity is highlighted prior to incorporating a media element representative of a user, which may be used to facilitate communication in accordance with some embodiments of the disclosure.
Figure 5C:
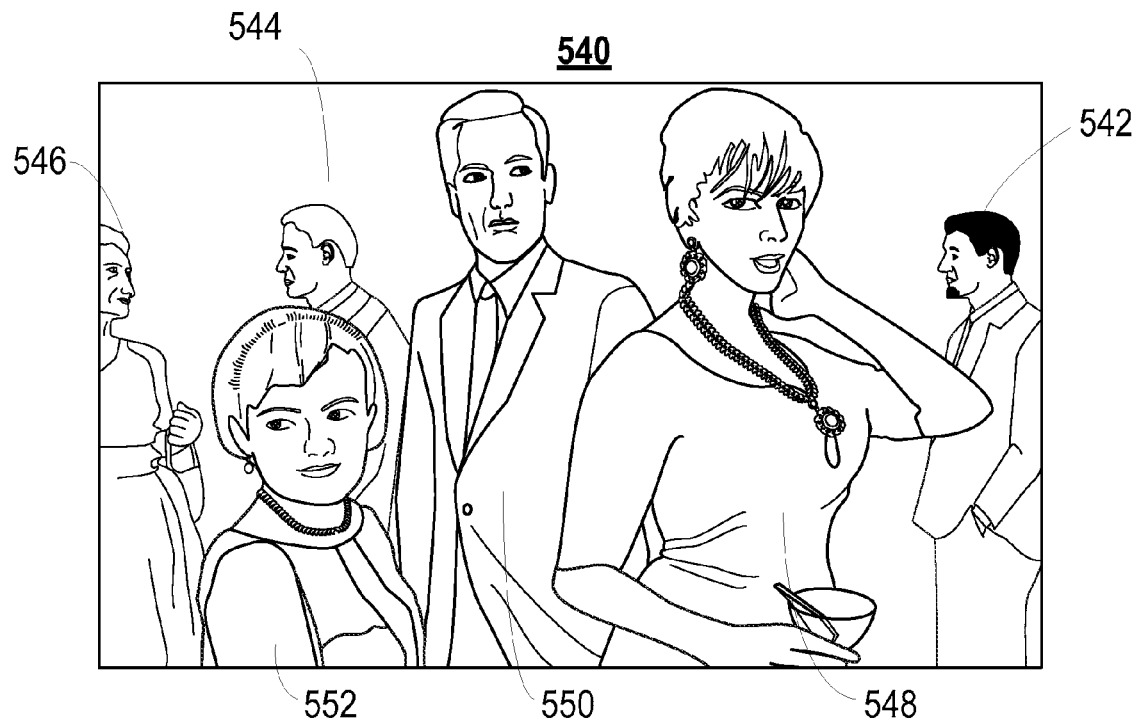
FIG. 5C shows an illustrative display of a media asset incorporating a media element representative of a user, which may be used to facilitate communication in accordance with some embodiments of the disclosure.
Figure 5D:
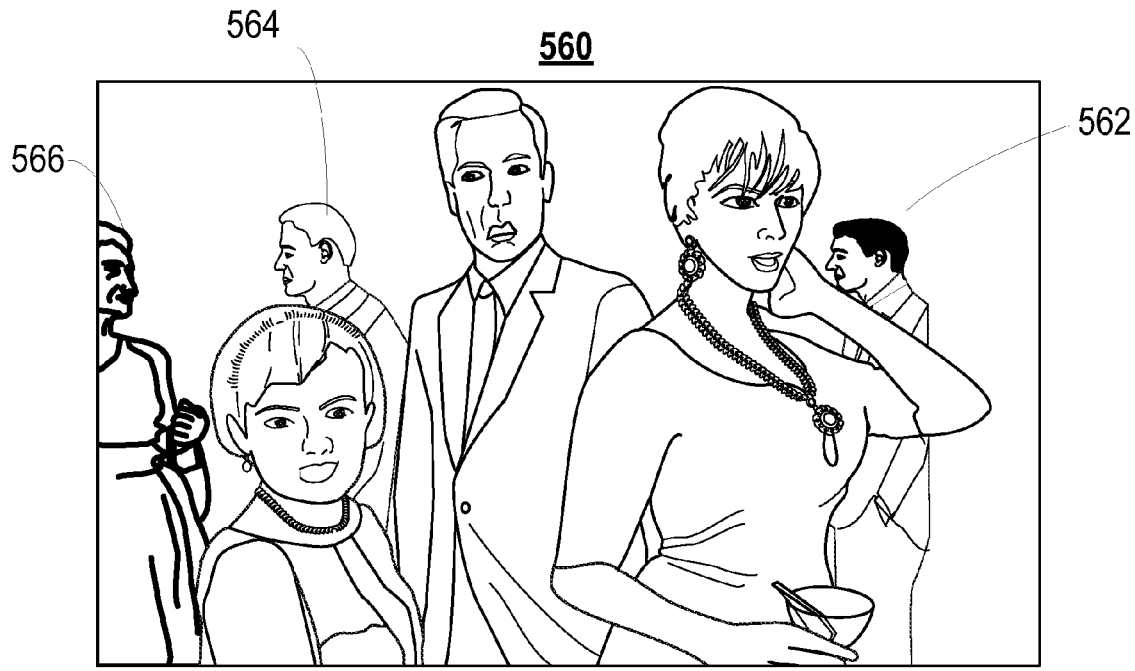
FIG. 5D shows an illustrative display of a media asset incorporating a media element representative of a user that changes position on the display in accordance with some embodiments of the disclosure.
Figure 6A:
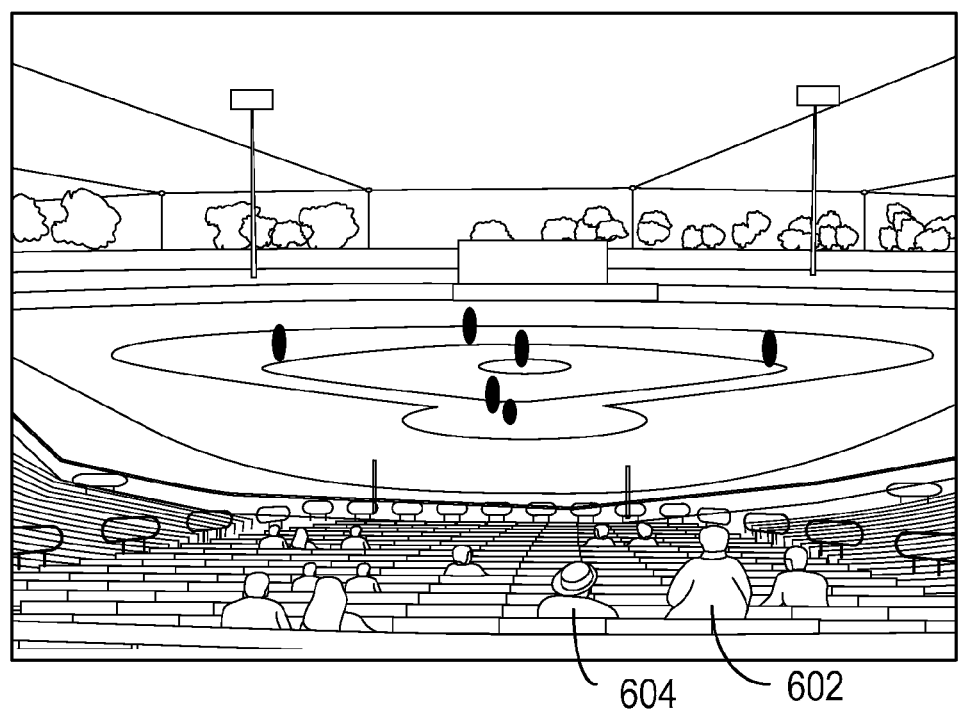
FIG. 6A shows an illustrative display of a media asset from a viewpoint that may be used to facilitate communication in accordance with some embodiments of the disclosure.
Figure 6B:
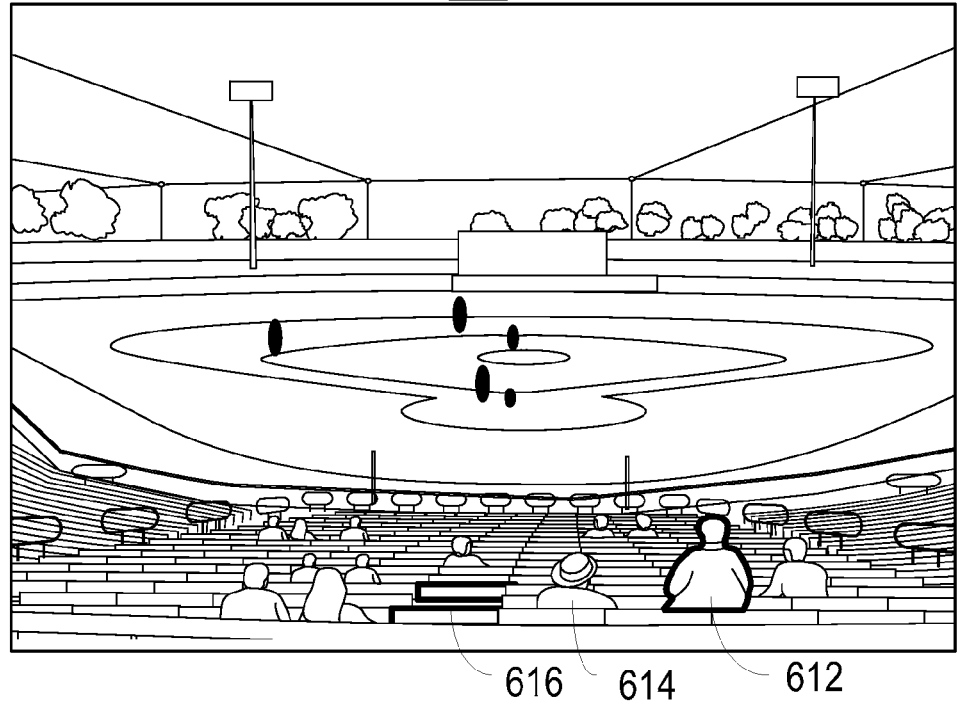
FIG. 6B shows an illustrative display of a media asset in which an entity is highlighted prior to incorporating a media element representative of a user, which may be used to facilitate communication in accordance with some embodiments of the disclosure.
Figure 6C:
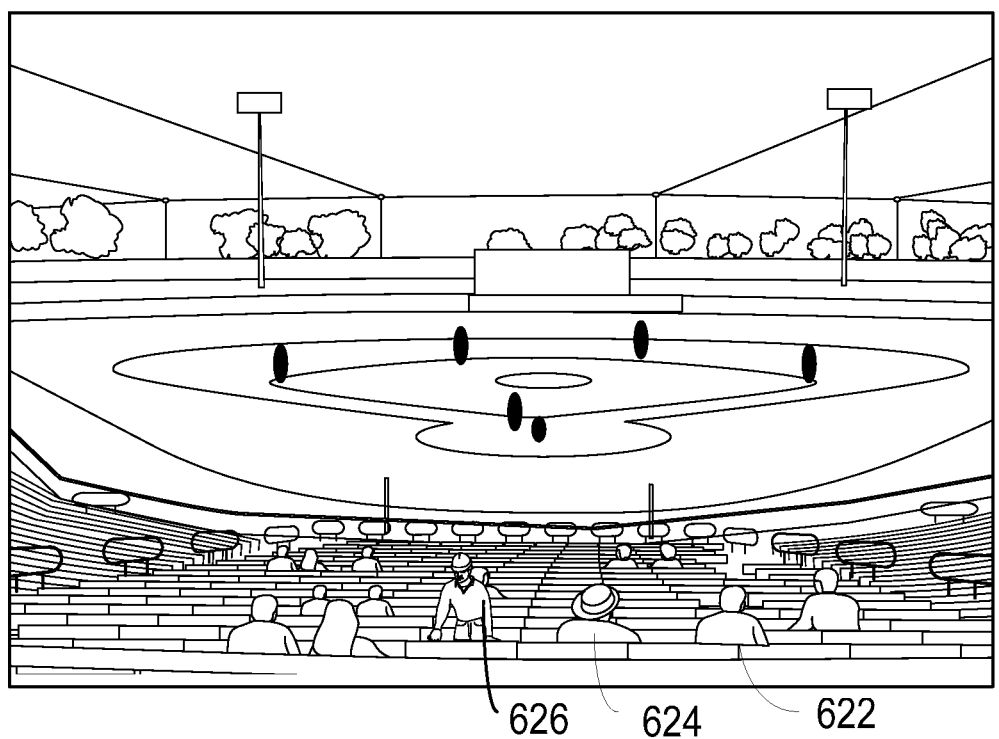
FIG. 6C shows an illustrative display of a media asset from a viewpoint showing the insertion of a media element representative of a user that may be used to facilitate communication in accordance with some embodiments of the disclosure.

In some embodiments, display 312 may correspond to display 100 (FIG. 1), display 200 (FIG. 2), display 500 (FIG. 5A), display 520 (FIG. 5B), display 540 (FIG. 5C), display 560 (FIG. 5D), display 600 (FIG. 6A), display 610 (FIG. 6B), and display 620 (FIG. 6C).

Speakers 314 may be provided as integrated with other elements of user equipment device 300 or may be stand-alone units. The audio component of videos and other content displayed on display 312, as well as communication between users, may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled, allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that, in the exemplary embodiment shown in FIG. 4, it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416, which, in some embodiments, may be the source of a media asset, may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Content source 416 may include processor 440, memory 442, input module 444, processing module 446, and insertion module 448. In some embodiments, processor 440 may be used to instruct the media guidance application via control circuitry 304 (FIG. 3) and/or coordinate the actions between the various modules. In some embodiments, memory 442 may be used to store various information including, but not limited to, real-time information and user information, including, but not limited to, user profiles.

In some embodiments, input module 444 may receive indications that multiple users are accessing media assets on multiple user equipment devices. In some embodiments, the processing module 446 may search for user information associated with each user for indicia that the users desire to communicate with each other. In response to the search, the media guidance application may identify a portion of the media asset suitable for indicating another user is currently accessing the same media asset as an initial user, and select a media element representative of the users based on the identified portion. In some embodiments, insertion module 448 may insert the selected media element of the other user at the identified portion of the media asset being accessed by the initial user's user equipment.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Content source 416 may include processor 450, memory 452, input module 454, processing module 456, and insertion module 458. In some embodiments, processor 450 may be used to instruct the media guidance application via control circuitry 304 (FIG. 3) and/or coordinate the actions between the various modules. In some embodiments, memory 452 may be used to store various information including, but not limited to, real-time information and user information, including, but not limited to, user profiles.

In some embodiments, input module 454 may receive indications that multiple users are accessing media assets on multiple user equipment devices. In some embodiments, the processing module 456 may search for user information associated with each user for indicia that the users desire to communicate with each other. In response to the search, the media guidance application may identify a portion of the media asset suitable for indicating another user is currently accessing the same media asset as an initial user, and select a media element representative of the users based on the identified portion. In some embodiments, insertion module 458 may insert the selected media element of the other user at the identified portion of the media asset being accessed by the initial user's user equipment.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

User equipment 402, 404, and 406 may include processor 460, 470, and 480, respectively, memory 462, 472, and 482, respectively, input module 464, 474, and 484, respectively, processing module 466, 476, and 486, respectively, and/or insertion module 468, 478, and 488, respectively. In some embodiments, processors 460, 470, and 480 may be used to instruct the media guidance application via control circuitry 304 (FIG. 3) and/or coordinate the actions between the various modules. In some embodiments, memories 462, 472, and 482 may be used to store various information including, but not limited to, real-time information (e.g., real-time data and metadata) and user information, including, but not limited to, user profiles.

In some embodiments, input modules 464, 474, and 484 may receive indications that multiple users are accessing media assets on multiple user equipment devices. In some embodiments, the processing modules 466, 476, and 486 may search for user information associated with each user for indicia that the users desire to communicate with each other. In response to the search, processing modules 466, 476, and 486 identify a portion of the media asset suitable for indicating another user is currently accessing the same media asset as an initial user, and select a media element representative of the users based on the identified portion. In some embodiments, insertion modules insertion module 468, 478, and 488 may insert the selected media element of the other user at the identified portion of the media asset being accessed by the initial user's user equipment.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally stored content.

As stated above, user equipment may incorporate, or be connected to, various image capture devices, such as camcorders, digital cameras with video mode, audio recorders, mobile phones, and handheld computing devices, for use in recording content or in capturing media elements representative of a user. In some embodiments, the media guidance application may store the captured image(s) as one or more media elements associated with the user.

The media elements may be captured and/or updated at any time. For example, the media elements, including any video and/or audio components included in the media elements, may be captured and/or updated continuously (e.g., real-time video) or at regular intervals. In some embodiments, the media elements may be captured and/or updated upon activating the media guidance application. In some embodiments, the media elements may be captured and/or updated at any time the media guidance application deems a media element is necessary. For example, the media guidance application may process the existing media elements, as disclosed in relation to FIG. 13 below, to determine whether or not the media elements are suitable for insertion into a media asset. If the media guidance application determines that the existing media elements are not sufficient, the media guidance application may direct an image capture device to capture another media element and/or update an existing media element associated with a user. The use and transmission of media elements representative of a user is discussed in more detail in relation to FIG. 10 below.

In other embodiments, the media element may be downloaded or received from another device (e.g., any of the user equipment shown in FIG. 4 above). For example, in some embodiments, the media element may be stored on user equipment 402, 404, and 406 (FIG. 4) and transmitted to content source 416 (FIG. 4), media guidance source 422 (FIG. 4), or any device accessible via communications network 414 (FIG. 4). In some embodiments, the media element may be embedded in other data (e.g., a media asset) that is sent or received by the media guidance application. In some embodiments, the media element may be sent or received as a separate file. For example, in some embodiments, the media guidance application may transmit the media element from the user equipment of a first user, to whom the media element relates, to the user equipment of a second user, for insertion into a media asset shown to the second user as described in FIG. 7. In some embodiments, the media guidance application may transmit the media element from the user equipment of a user to whom the media element relates to a remote server (e.g., media guidance source 422 (FIG. 7) for insertion into a media asset that is transmitted to another user.

The user can upload content to a content storage service on the cloud either directly, for example, from user computer equipment 404 or wireless user communications device 406 having an image capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIGS. 5A-D show illustrative displays that may be used to facilitate communication in accordance with some embodiments of the disclosure. In some embodiments, FIGS. 5A-D may represent a series of screen-shots of the same media asset (e.g., a movie, television program, and/or webcast). For example, FIG. 5A may occur immediately before FIG. 5B, which may occur immediately before FIG. 5C, which may occur immediately before FIG. 5D. In some embodiments, display 500 (FIG. 5A), display 520 (FIG. 5B), display 540 (FIG. 5C), and display 560 (FIG. 5D) may appear on the display screen (e.g., display 312 (FIG. 3)) of one or more user equipment devices (e.g., user equipment 402, 404, and 406 (FIG. 4)). In some embodiments, display 500 (FIG. 5A), display 520 (FIG. 5B), display 540 (FIG. 5C), and display 560 (FIG. 5D) may correspond to displays shown on a single user equipment used by an initial user to access a media asset. It should be understood that in some embodiments, other users, in addition to the initial user may have the same or corresponding displays shown on their user equipment.

FIG. 5A shows an illustrative display that may be used to facilitate communication in accordance with some embodiments of the disclosure. FIG. 5A shows display 500. In some embodiments, display 500 may correspond to a program (e.g., a television program) currently being accessed on user equipment (e.g., user equipment 402, 404, and 406 (FIG. 4) via a display (e.g., display 312 (FIG. 3)). Display 500 contains portion 502, portion 504, and portion 506. Portion 502, portion 504, and portion 506 each contain an entity. For example, the media guidance application may use object recognition to detect entities (e.g., extras) included in the background of the program as opposed to characters (e.g., actress 508, actor 510, and actress 512) in the foreground of the program.

Figure 7:
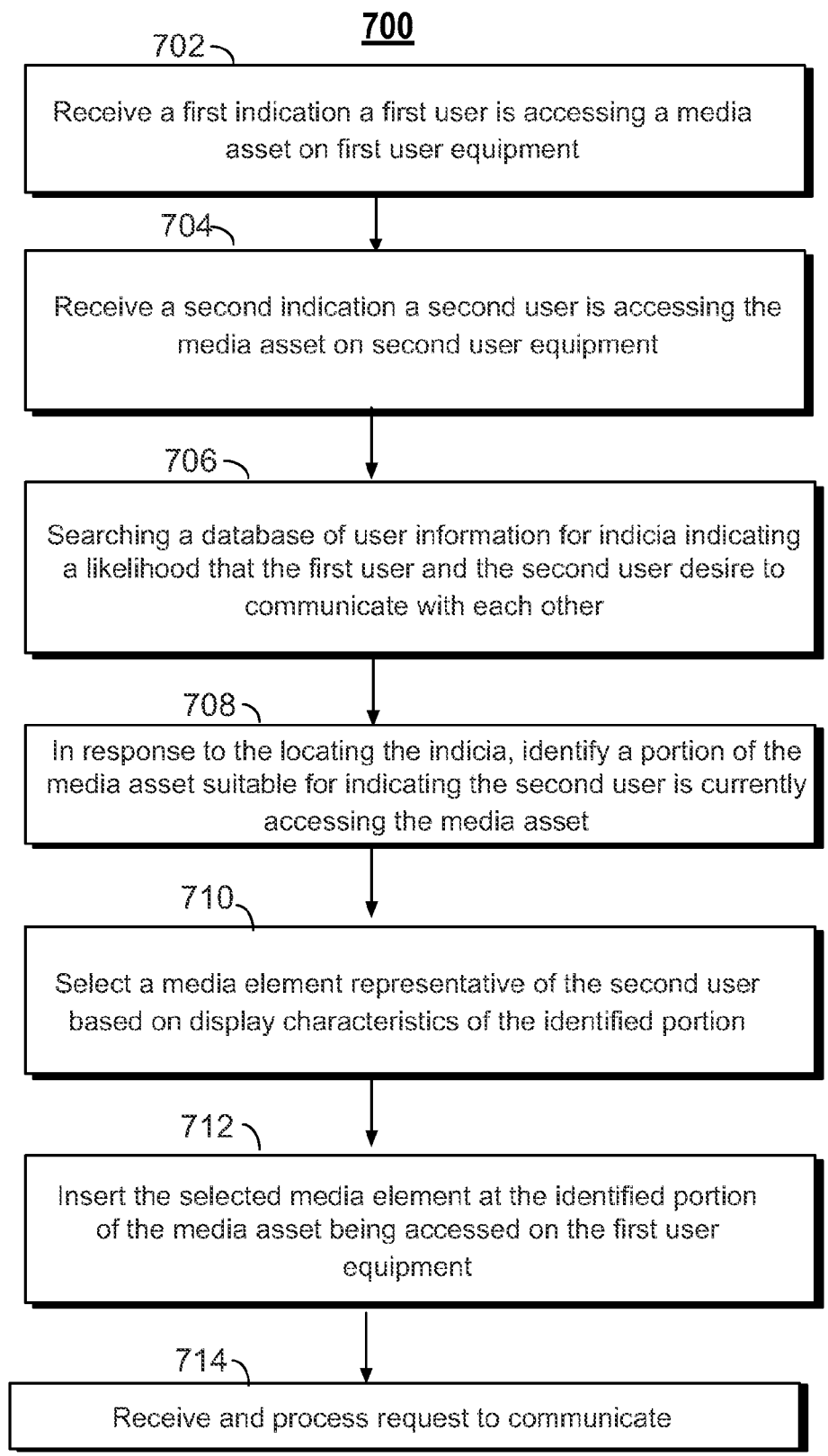
FIG. 7 is a flowchart of illustrative steps involved in facilitating communication between two users accessing a common media asset in accordance with some embodiments of the disclosure.

In some embodiments, the media guidance application may replace the entities located in the media asset with media elements representative of users accessing the media asset as discussed in relation to process 700 (FIG. 7). For example, an initial user accessing the program may wish to discuss the program with other users accessing the same program. In some embodiments, the media guidance application may determine which media asset is being accessed by the user via real-time data or metadata (e.g., transmission file 900 (FIG. 9)) associated with the media asset as discussed in step 702 (FIG. 7). In addition, in some embodiments, the media guidance application may determine the particular point of playback or progress in the media asset at which the user is currently watching. In some embodiments, the media guidance application may limit or prevent communication with the users that are further along in the playback or progress of a program so as to prevent other users from communication details that may "spoil" the program.

The media guidance application may receive information or search for other users accessing the same media asset (e.g., the program) as the initial user. For example, in some embodiments, the media guidance application may incorporate one or more steps of process 800 (FIG. 8) to locate other users. Upon determining that the initial user and the other users are accessing the same media content, the media guidance application may search information (e.g., a user profile) associated with each user for indicia of a desire to communicate. In some embodiments, the media guidance application may incorporate one or more steps of process 1100 (FIG. 11) and/or process 1200 (FIG. 12) to search for indicia of a desire of the users to communicate with each other. For example, in some embodiments, the media guidance application may compare the user profiles to each other (e.g., as described in process 1100 (FIG. 11)) or may compare each user profile to a lookup table (e.g., as described in process 1200 (FIG. 12)) to determine whether or not the users are likely to desire to communicate with each other.

In response to locating indicia between two users accessing the same media asset, and in some embodiments, the same point in playback or progress of the media asset, the media guidance application identifies a portion of the media asset as displayed on the display (e.g., display 500) of each user's user equipment (e.g., user equipment 402, 404, and 406 (FIG. 4)) featuring an entity (e.g., portion 502, portion 504, and portion 506) or empty or unused space (e.g., portion 504) for insertion of a media element representative of another user accessing the media asset.

FIG. 5B shows display 520. In display 520, the media guidance application has identified three portions in the media asset (e.g., as discussed in relation to step 708 (FIG. 7). Portion 522 and portion 526 each contain an entity (e.g., an extra). Portion 524 contains empty or unused space (e.g., a blank wall). In some embodiments, the media guidance application may identify the portions suitable for indicating other users currently accessing the media asset by interpreting tags or chroma keyed elements found in the media asset or real-time data or metadata. For example, in some embodiments, the content source 416 (FIG. 4) or media guidance source 418 (FIG. 4) may transmit the media asset with the particular portions already tagged. In another example, the media guidance application may detect particular portions through object recognition technology. For example, the media guidance application may differentiate between objects in the foreground and objects in the background, or objects in focus (e.g., the main characters) and objects out of focus (e.g., characters in the background of a scene). In some embodiments, the media guidance application may insert a media element by overlaying particular portions of the media asset with media elements representative of users.

In some embodiments, the media guidance application highlights portions to indicate to the user that a media element will be inserted into the portion, e.g., within a short period of time. In display 520, the entities in portion 522 and portion 524 are highlighted by the media guidance application, indicating that the media guidance application is inserting a media element into the media asset in that particular portion (e.g., as discussed in relation to step 712 (FIG. 7)). In portion 522, only the face of the entity in portion 522 is highlighted by the media guidance application, indicating that only the face of the entity included in portion 522 is being replaced or supplemented by the media guidance application. In portion 524, the media guidance application has highlighted the entire body of the media element, indicating that the entire body of the media asset is being replaced (e.g., with a media element representative of an entire body of a user). Portion 524 represents a blank space or unused background space in the media asset.

Figure 10:
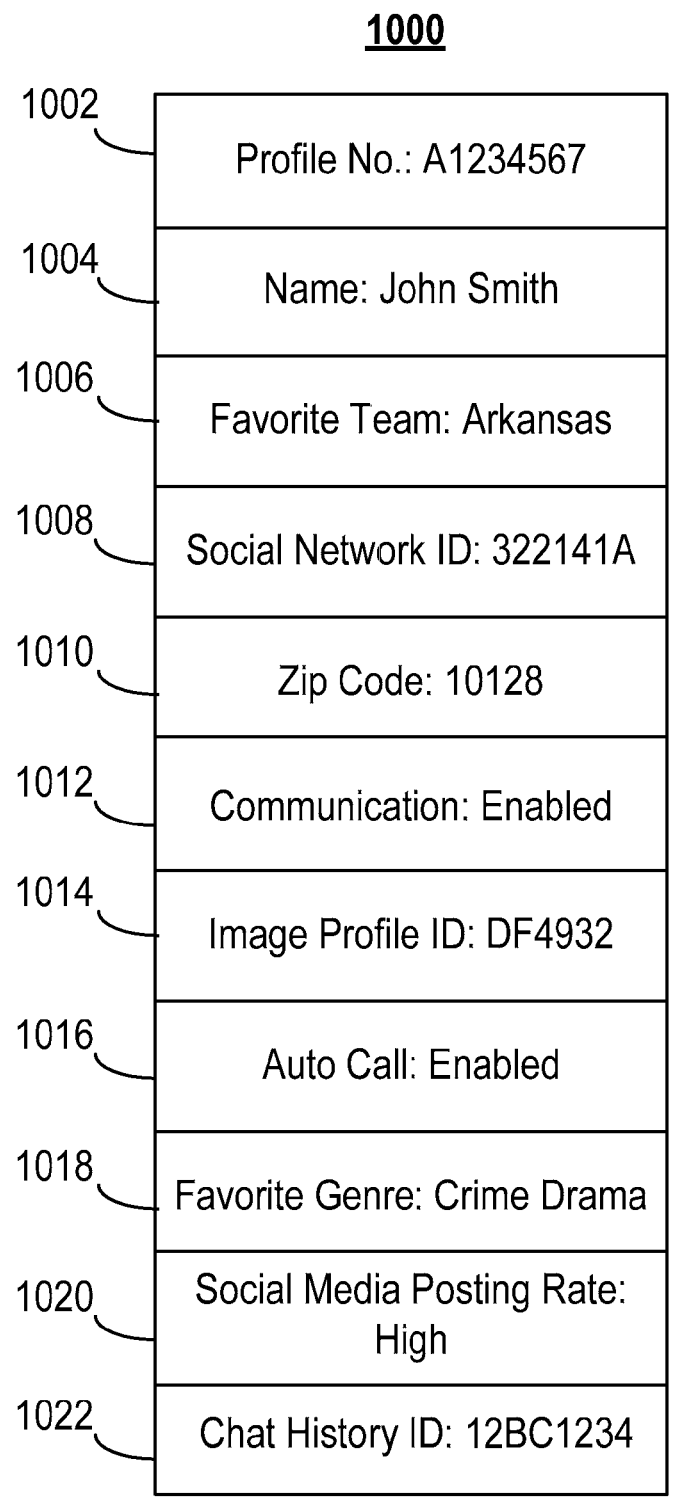
FIG. 10 shows an exemplary data structure for a compilation of data associated with a user profile in accordance with some embodiments of the disclosure.

In some embodiments, the media guidance application may select the media element (e.g., as discussed in relation to step 710 (FIG. 7)) associated with a user based on a user profile (e.g., array 1000 (FIG. 10). The user profile may have an image, or images, associated with the user, which may be stored on the content source 416 (FIG. 4), media guidance source 418 (FIG. 4), user equipment 402, 404, and 406 (FIG. 4), and/or any device accessible via communications network 414 (FIG. 4).

FIG. 5C shows display 540. Display 540 includes media element 542, media element 544, and portion 546. Media element 542 and media element 544 may correspond to portion 522 (FIG. 5B) and portion 524 (FIG. 5B), respectively. Media element 542 and media element 544 may represent two users who are currently accessing the same media asset as an initial user, who is accessing the program on her user equipment.

In some embodiments, the media elements (e.g., media element 542 and media element 544) may change as the program progresses. For example, the media guidance application may periodically, or in real-time, add, delete, or alter the particular users represented in the media asset. In some embodiments, the media guidance application may remove a media element upon detecting that the user is no longer accessing the media asset or has progressed to a different point in the media asset (e.g., by pausing, fast-forwarding or re-winding the media asset).

In some embodiments, the media guidance application may periodically, or in real-time adjust the appearance of the media element (e.g., media element 542 and media element 544) representing each user. In some embodiments, the media guidance application may insert an image or graphic of a user transmitted in real-time from the user equipment of the user. For example, the media guidance application may retrieve an image of a user using a camera incorporated into the user equipment.

FIG. 5D shows display 560. Display 560 includes media element 562, media element 564, and portion 566. The entity in portion 566 is now highlighted. In some embodiments, this may indicate that an additional user has accessed the same media asset as the initial user. Media element 562 and media element 564 may correspond to portion 522 (FIG. 5C) and portion 524 (FIG. 5C), respectively. Media element 562 and media element 564 may represent two other users that are currently accessing the same media asset as an initial user, who is accessing the program on her user equipment.

In some embodiments, display 560 may represent a further progression of display 540 (FIG. 5C). For example, in display 560, media element 562 has moved across the display screen relative to the position of media element 542 (FIG. 5C). In response to the movement, the media guidance application has updated the media element 562 so that the media element 562 moves along with the entity initially positioned in portion 502 (FIG. 5A) as discussed in relation to process 1300 (FIG. 13) below.

In some embodiments, media elements representative of the same user may periodically or continuously appear through the media asset inserting media elements in portions of the media asset that contain entities. In some embodiments, a media element representative of the same user may only appear once in the playback or progress of the media asset. For example, the media element representative of one particular user may supplement only one entity in the media asset. In some embodiments, the position or placement of the media element of a particular entity, or the particular user whose media element is inserted into the media asset may depend on the ranking (e.g., as discussed in more detail in relation to process 1100 (FIG. 11)) of the desirability of communication between the users.

It should be noted that the displays (e.g., display 500 (FIG. 5A), display 520 (FIG. 5B), display 540 (FIG. 5C), and display 560 (FIG. 5D)) may result from, or incorporate, one of more of the steps of the processes and/or embodiments described throughout this disclosure.

FIGS. 6A-C show illustrative displays that may be used to facilitate communication in accordance with some embodiments of the disclosure. In some embodiments, FIGS. 6A-C may represent a series of screen-shots of the same media asset. For example, FIG. 6A may occur immediately before FIG. 6B, which may occur immediately before FIG. 6C. In some embodiments, display 600 (FIG. 6A), display 610 (FIG. 6B), and display 620 (FIG. 6C) may appear on the display screen (e.g., display 312 (FIG. 3)) of one or more user equipment devices (e.g., user equipment 402, 404, and 406 (FIG. 4)). In some embodiments, display 600 (FIG. 6A), display 610 (FIG. 6B), and display 620 (FIG. 6C) may correspond to displays shown on a single user equipment used by an initial user to access a media asset. It should be understood that in some embodiments, other users, in addition to the initial user, may have the same or corresponding displays shown on their user equipment.

FIG. 6A shows an illustrative display that may be used to facilitate communication in accordance with some embodiments of the disclosure. FIG. 6A shows display 600. In some embodiments, display 600 may correspond to a program (e.g., a televised baseball game) currently being accessed on user equipment (e.g., user equipment 402, 404, and 406 (FIG. 4) via a display (e.g., display 312 (FIG. 3)). Display 600 contains portion 602 and portion 604. Portion 602 and portion 604 each contain an entity. For example, the media guidance application may use object recognition to detect entities included in the crowd or audience.

In some embodiments, the media guidance application may replace the entities located in the media asset with media elements representative of users accessing the media asset as discussed in relation to process 700 (FIG. 7). For example, an initial user watching a baseball game may wish to discuss the baseball game with other users watching the same game. In some embodiments, the media guidance application may determine the media asset being accessed by the user via real-time data or metadata (e.g., transmission file 900 (FIG. 9)) associated with the media asset as discussed in step 702 (FIG. 7).

The media guidance application may receive information or search for other users accessing the same media asset (e.g., a baseball game) as the initial user. For example, in some embodiments, the media guidance application may incorporate one or more steps of process 800 (FIG. 8) to locate other users. Upon determining that the initial user and the other users are accessing the same media content, the media guidance application may search information (e.g., a user profile) associated with each user for indicia of a desire to communicate. In some embodiments, the media guidance application may incorporate one or more steps of process 1100 (FIG. 11) and/or process 1200 (FIG. 12) to search for indicia of a desire of the users to communicate with each other. For example, in some embodiments, the media guidance application may compare the user profiles to each other (e.g., as described in process 1100 (FIG. 11)) or may compare each user profile to a lookup table (e.g., as described in process 1200 (FIG. 12)) to determine whether or not the users desire to communicate with each other.

In response to locating indicia of a desire to communicate between two users accessing the same media asset, and in some embodiments, the same point in playback or progress of the media asset, the media guidance application identifies a portion (e.g., portion 602 and portion 604) of the media asset as displayed on the display (e.g., display 600) of each user's user equipment (e.g., user equipment 402, 404, and 406 (FIG. 4)) featuring an entity (e.g., a person displayed in the crowd of the baseball game) or empty or unused space (e.g., an empty seat).

FIG. 6B shows display 610 of a media asset showing an entity being highlighted in preparation for receiving a insertion of a media element representative of a user that may be used to facilitate communication. In display 610, the media guidance application has located three portions in the media asset. Portion 612 and portion 614 each contain an entity (e.g., a person in the crowd of the baseball game). Portion 616 contains empty or unused space (e.g., an empty seat in the crowd of the baseball game). In some embodiments, the media guidance application may identify the portions suitable for indicating other users currently accessing the media asset by interpreting tags or chroma keyed elements found in the media asset or real-time data or metadata. For example, in some embodiments, the content source 416 (FIG. 4) or media guidance source 418 (FIG. 4) may transmit the media asset with the particular portions already tagged. In another example, the media guidance application may detect particular portions through object recognition technology. For example, the media guidance application may differentiate between objects in the foreground and objects in the background, or objects in focus (e.g., the main characters) and objects out of focus (e.g., the background or the crowd).

In display 610, the entity in portion 612 is highlighted, indicating that the media guidance application is inserting a media element into the media asset in that particular portion. In some embodiments, the media guidance application may not highlight a portion (e.g., portion 612) in order to lessen the distractions to a user accessing the media asset.

FIG. 6C shows display 620. Display 620 includes media element 622, portion 624, and media element 626. Media element 622 and media element 626 may correspond to portion 612 and portion 616, respectively. Media element 622 and media element 626 may represent two users that are currently accessing the same media asset as an initial user. In some embodiments, portion 624 may be reserved, or left to represent the initial user in the media asset displayed on the user equipment (e.g., user equipment 402, 404, and 406 (FIG. 4)) of other users. In some embodiments, on the initial user's user equipment, portion 624 may include an insertion of a media element representative of the initial user.

For example, in some embodiments, the media guidance application may coordinate the location of the media elements of other users as displayed on the initial user's user equipment with the media element of the initial user as displayed on the other users' user equipment. In this respect, the media guidance application may imitate a scenario where the users are seated next to each other at the live filming of the media asset. In addition, the initial user and other users may be able to communicate as if the users were seated together. For example, the media guidance application may receive audio input (e.g., via user input interface 310 (FIG. 3)) and present audio output (e.g., via speakers 314 (FIG. 3)) on each user's respective device.

In some embodiments, the media elements (e.g., media element 622 and media element 626) may change as the program progresses. For example, the media guidance application may periodically, or in real-time, add, delete, or alter the particular users represented in the media asset. In some embodiments, the media guidance application may delete a user upon detecting the user is no longer accessing the media asset or has progressed to a different point in the media asset (e.g., by pausing, fast-forwarding or re-winding the media asset).

In some embodiments, the media guidance application may periodically, or in real-time, alter the appearance of the media element (e.g., media element 622 and media element 626) representing each user. For example, the media guidance application may provide an image or graphic of a user transmitted in real-time from the user equipment of the user.

It should be noted that the displays (e.g., display 600 (FIG. 6A), display 610 (FIG. 6B), and display 620 (FIG. 6C)) may result from, or incorporate, one or more of the steps of the processes and/or embodiments described throughout this disclosure.

FIG. 7 is a flowchart of illustrative steps involved in facilitating communication between two users accessing a common media asset in accordance with some embodiments of the disclosure. Process 700 may be used to provide the displays, which facilitate communication, as shown in FIGS. 5A-D and 6A-C. It should be noted that process 700, or any step thereof, could be displayed on, or provided by, any of the devices shown in FIGS. 3-4. For example, process 700 may be executed by control circuitry 304 (FIG. 3) as instructed by the media guidance application.

At step 702, the media guidance application receives a first indication a first user is accessing a media asset on first user equipment. At step 704, the media guidance application receives a second indication a second user is accessing the media asset on second user equipment. In some embodiments, the first and second indication may be derived from information transmitted from the content source 416 (FIG. 4), media guidance source 48 (FIG. 4), and/or user equipment 402, 404, 406 (FIG. 4). For example, in some embodiments, user equipment 402, 404, and 406 (FIG. 4) may transmit a data packet or packets including a data structure (e.g., transmission file 900 (FIG. 9). The data structure may include in real-time data or metadata (e.g., asset indicator 906, progress indicator 908, and/or date and time indicator 910 (FIG. 9)) associated with the program currently being accessed on the user equipment. The media guidance application may process the indications to determine the particular media asset (e.g., as determined by asset indicator 906 (FIG. 9)), and the particular point of progress in the media asset (e.g., as determined by progress indicator 908 (FIG. 9)) displayed on the user's user equipment (e.g., as shown in display 500 (FIG. 5A), display 520 (FIG. 5B), display 540 (FIG. 5C), and display 560 (FIG. 5D)).

At step 706, the media guidance application searches a database of user information for indicia indicating a likelihood that the first user and the second user desire to communicate with each other. In some embodiments the database may include information associated with the first user and second user for indicia indicating a likelihood that the first user and the second user desire to communicate with each other. In some embodiments, the media guidance application may retrieve a user profile (e.g., array 1000 (FIG. 10) for each user. The media guidance application may process the user profile according to one or more steps of process 1100 (FIG. 11) and process 1200 (FIG. 12). In some embodiments, database may be located on content source 416 (FIG. 4), media guidance source 48 (FIG. 4), and/or user equipment 402, 404, 406 (FIG. 4). In some embodiments, user information may be transmitted in real-time data or metadata (e.g., user profile identifier 918 (FIG. 9)).

At step 708, the media guidance application identifies a portion (e.g., portion 502 (FIG. 5A)) of the media asset suitable for indicating the second user is currently accessing the media asset. In some embodiments, the media guidance application may analyze the media asset to determine the particular objects within the display of the media asset that may be removed or supplemented by the media guidance application without distracting the user (e.g., differentiating between actor 510 (FIG. 5A) and the entity in portion 502 (FIG. 5A)). As shown in FIGS. 5A-D and 6A-C, the media guidance application may locate portions, objects, and/or entities in the media asset.

At step 710, the media guidance application may select a media element representative of the second user based on display characteristics of the identified portion. In some embodiments, the media guidance application may select the media element from the content source 416 (FIG. 4), media guidance source 48 (FIG. 4), and/or user equipment 402, 404, 406 (FIG. 4). In some embodiments, the media element may be selected in real-time. For example, as discussed in depth in relation to FIG. 13, the media guidance application may select the media element according to the progression, or change, if any, in the identified portion. For example, as shown in FIGS. 5C and 5D, the identified portion may change as the media asset progresses. The media guidance application may adjust the media element (e.g., media element 562 (FIG. 5D) so that the media element seamlessly transitions and/or interacts with other portions of the media asset.

At step 712, the media guidance application inserts the selected media element at the identified portion of the media asset being accessed on the first user equipment (e.g., as shown and discussed in media element 542 (FIG. 5C) and media element 544 (FIG. 5C)). Upon viewing other users, the initial user may automatically, or upon user input (e.g., via user input interface 310 (FIG. 3)), communicate with other users.

At step 714, the media guidance application receives and processes a request to communicate from the user. In some embodiments, communication between the users may occur according to the settings (e.g., selectable options 204, 206, 208, 210, 212, and/or 214 (FIG. 2)) selected by each user. In some embodiments, following a request to communicate the users may enter a chat session, send and receive messages, or otherwise communicate (e.g., via a telephone). The communication may occur through the use of audio, video or textual means and occur through either the user equipment used to view the media asset or another user equipment device (e.g., a telephone or second screen device). In some embodiments, the users may be directed to a remote source (e.g., a remotely hosted chat room, video conference, web-site, etc.).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
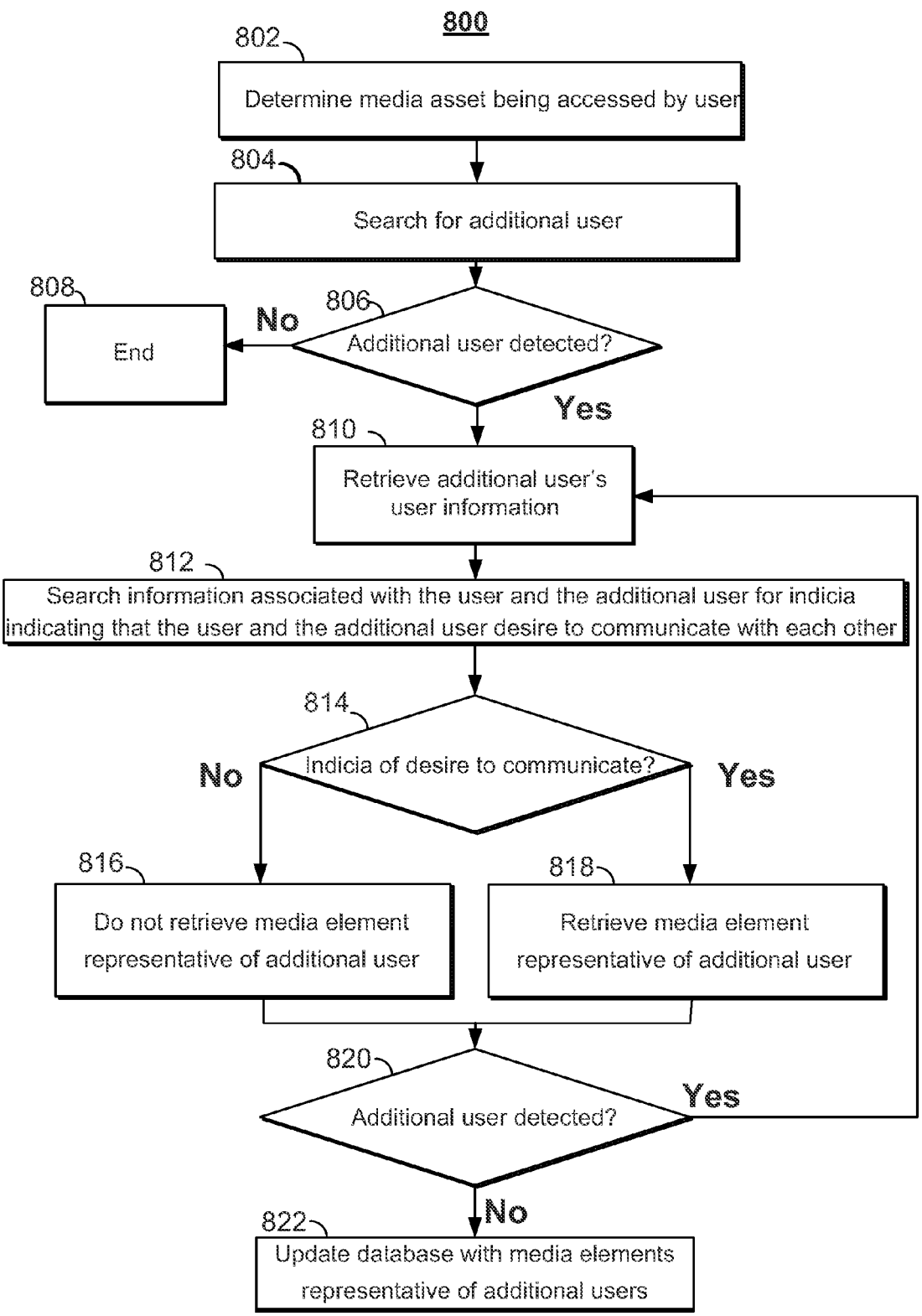
FIG. 8 is a flowchart of illustrative steps involved in facilitating communication between two users accessing a common media asset in accordance with some embodiments of the disclosure.

FIG. 8 is a flowchart of illustrative steps involved in facilitating communication between two users accessing a common media asset in accordance with some embodiments of the disclosure. Process 800 may be used to provide the media elements inserted into the media asset, which facilitates communication between two users, as shown in FIGS. 5A-D and 6A-C. It should be noted that process 800 or any step thereof, could be displayed on, or provided by, any of the devices shown in FIGS. 3-4. For example, process 800 may be executed by control circuitry 304 (FIG. 3) as instructed by the media guidance application.

At step 802, the media guidance application determines the media asset being accessed by the user. In some embodiments, step 802 may correspond to step 702 (FIG. 7). In some embodiments, to determine the media asset, the media guidance application may receive information in real-time data or metadata (e.g., asset indicator 906 (FIG. 9)) transmitted with the media asset. The media guidance application may receive the real-time data or metadata from content source 416 (FIG. 4), media guidance source 418 (FIG. 4), user equipment 402, 404, and 406 (FIG. 4), and/or any other device accessible from communications network 414 (FIG. 4).

At step 804, the media guidance application searches for additional users accessing the same media content as the initial user. In some embodiments, the media guidance application may perform searches upon receiving a request from a user (e.g., following a user selecting selectable option 204 (FIG. 2)), after periodic intervals, or continuously in real-time. In some embodiments, the media guidance application may search the user equipment (e.g., user equipment 402, 404, and 406 (FIG. 4)), or real-time data or metadata received therefrom, of additional users. In some embodiments, the media guidance application may search for additional users by processing information received from content source 416 (FIG. 4) and/or media guidance source 418 (FIG. 4)).

At step 806, the media guidance application determines whether or not additional users are found. If an additional user is not detected, the media guidance application ends at step 808. If an additional user is detected, the media guidance application continues to step 810. At step 810, the media guidance application retrieves user information for any additional users found in step 806. For example, the media guidance application may retrieve a user profile for any additional user found to be accessing the same media asset as the initial user. The user profile may be retrieved from content source 416 (FIG. 4), media guidance source 418 (FIG. 4), user equipment 402, 404, and 406 (FIG. 4), or any other device accessible via the communications network 414 (FIG. 4).

At step 812, the media guidance application searches information associated with the initial user and the additional user for indicia indicating that the initial user and the additional user desire to communicate with each other. In some embodiments, step 812 may incorporate one or more steps of process 1100 (FIG. 11) and/or process 1200 (FIG. 12). For example, the media guidance application may compare the data fields of the initial user's user profile and the additional user's user profile for indicia that the users desire to communicate, or the media guidance application may compare the values in each user profile to the values in a lookup table to determine whether or not each user desires to communicate.

At step 814, the media guidance application determines whether or not indicia of a desire to communicate are detected. In some embodiments, a single indicia, for example, a single value in a single data field of a user profile (e.g., data field 1012 (FIG. 10)) may indicate a desire to communicate. In some embodiments, the media guidance application may require several indicia to determine the users' desire to communicate. For example, the media guidance application may assign values to particular data fields in a user profile and compare the values, either individually or combined, to a threshold value. In such an example, a value greater than the threshold value may represent the indicia of a desire to communicate.

If indicia of a desire to communicate are not found, the media guidance application does not retrieve a media element representative of the additional user at step 816. If indicia of a desire to communicate are found, the media guidance application retrieves a media element representative of the additional user at step 818. In some embodiments, the media element may be retrieved from content source 416, media guidance source 418, user equipment 402, 404, and 406 (FIG. 4), and/or any device accessible via the communications network 414 (FIG. 4).

Following step 816 or step 818, the media guidance application proceeds to step 820. At step 820, the media guidance application searches for additional users. If an additional user is found the media guidance application returns to step 810. If an additional user is not found the media guidance application proceeds to step 822. At step 822, the media guidance application updates a database with media elements representative of additional users. In some embodiments, the database may be located at content source 416, media guidance source 418, user equipment 402, 404, and 406 (FIG. 4), and/or any device accessible via communications network 414 (FIG. 4).

In some embodiments, the media elements may be retrieved from content source 416, media guidance source 418, user equipment 402, 404, and 406 (FIG. 4), and/or any device accessible via communications network 414 (FIG. 4). For example, the media elements may be stored in a user profile associated with each user. In some embodiments, the media elements may be generated in real-time (e.g., via a camera incorporated into user equipment 402, 404, and 406 (FIG. 4)).

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method.

FIG. 9 shows an exemplary data structure for a transmission file (e.g., an XML file) associated with a media asset in accordance with some embodiments of the disclosure. Transmission file 900 may be transmitted to the media guidance application by content source 416 (FIG. 4), media guidance source 418 (FIG. 4), user equipment 402, 404, or 406 (FIG. 4) or any other source accessible via the communications network 414 (FIG. 4). Transmission file 900 may be transmitted to the media guidance application in metadata accompanying the media asset. In some embodiments, transmission file 900 may be sent or received by control circuitry 304 (FIG. 3) to provide information to the media guidance application.

Transmission file 900 contains transmission indicators 902 and 924. Transmission indicator 902 signals the beginning of transmission information. Transmission indicator 924 signals the end of transmission information. Transmission indicator 902 may also signal to the media guidance application that the transmission file 900 is being transmitted from user equipment (e.g., user equipment 402, 404, and 406 (FIG. 4)). In some embodiments, the transmission file may also be transmitted by content source 416 (FIG. 4) or media guidance source 418 (FIG. 4). Asset detail tag 904 signals to the media guidance application that the transmission file contains information about a media asset. The transmission file may include any information about the media asset needed by the media guidance application to facilitate communication (e.g., as described in relation to FIG. 7) between users. Asset detail tag 904 signals to the media guidance application the end of the information regarding the media asset in the transmission file 900.

Transmission file 900 includes asset indicator 906, progress indicator 908, and date and time indicator 910. Asset indicator 906 signals to the media guidance application the name of the media asset currently playing. Progress indicator 908 signals to the media asset the current point of progress of the media asset. Date and time indicator 910 signals the date and time of the broadcast of the media asset. For example, asset indicator 906, progress indicator 908, and date and time indicator 910 may be received by the media guidance application. The media guidance application may compare the asset indicator 906, progress indicator 908, and date and time indicator 910 received from a first user (e.g., via a transmission file received from the first user's user equipment) to the asset indicator 906, progress indicator 908, and date and time indicator 910 from a second user (e.g., via a transmission file received from the second user's user equipment). Based on the comparison, the media guidance application may determine whether or not the first and second users are accessing the same media asset.

Transmission file 900 includes user detail tag 914. User detail tag 914 signals the beginning of the information about the user in the transmission file 900. User detail tag 922 signals the end of the information about the user in the transmission file 900. For example, transmission file 900 may contain any information used to identify the user. In addition, transmission file 900 may include settings used to configure the media guidance application.

Transmission file 900 includes user name indicator 916. User name indicator 916 signals to the media guidance application the name of the user currently accessing a particular media asset (e.g., as signaled by asset indictor 906). Profile indicator 918 signals to the media guidance application the particular user profile associated with the user. For example, a user profile may be stored at content source 416 (FIG. 4), media guidance source 418 (FIG. 4), user equipment 402, 404, or 406 (FIG. 4) or any other source accessible via the communications network 414 (FIG. 4). The information in profile indicator 918 may be used by the media guidance application to locate the particular profile. Mode indicator 920 signals to the media guidance application the mode or setting currently applied to the media guidance application. For example, in some embodiments, mode indicator 920 may correspond to selectable option 204 (FIG. 2). For example, mode indicator 920 may be toggled to turn "silent" mode off, which indicates to the media guidance application that the user wishes to communicate with other users. Enabling silent mode may prevent communication with other users. In some embodiments, other signals corresponding to other selectable options (e.g., selectable option 206 (FIG. 2)) may be included in transmission file 900.

It should be noted that the lines in transmission file 900 are illustrative only and not meant to be limiting. It is contemplated that additional, different, or fewer lines, which may represent any other information found in a transmission file, may also be included in some embodiments.

FIG. 10 shows an exemplary data structure for user profile information in accordance with some embodiments of the disclosure, which may be transmitted to the media guidance application by content source 416 (FIG. 4), media guidance source 418 (FIG. 4), user equipment 402, 404, or 406 (FIG. 4), or any other source accessible via the communications network 414 (FIG. 4). Array 1000 may be transmitted to the media guidance application in real-time data or metadata accompanying the media asset. In some embodiments, array 1000 may be received by control circuitry 304 (FIG. 3) to provide information to the media guidance application.

For example, in some embodiments, user profile information received in array 1000 may provide, at least in part, the basis for determining the other user represented in the media asset in relation to step 712 of process 700 (FIG. 7). It should be noted that the information presented in array 1000 is illustrative and is not meant to be limiting as to the amount or type of information that may be transmitted to the media guidance application.

In some embodiments, array 1000 represents the data structure used by process 1100 (FIG. 11) or process 1200 (FIG. 12). For example, in some embodiments, the media guidance application may generate array 1000 from information received in a transmission file (e.g., transmission file 900 (FIG. 9)). Array 1000 may contain various data fields, which make up a user's user profile.

Data field 1002 may indicate to the media guidance application the particular user profile associated with array 1000. The user profile may have an identification number, which may be processed by control circuitry 304 (FIG. 3). Data field 1004 indicates to the media guidance application the user profile is associated with "John Smith." In some embodiments, array 1000 may be associated with a particular user or group of users (e.g., a family). Data field 1006 indicates to the media guidance application that the user's favorite team is "Arkansas." In some embodiments, the media guidance application may use this information to facilitate communication between fans of "Arkansas."

Data field 1008 indicates to the media guidance application the social network profile associated with this user profile. For example, in some embodiments, the media guidance application may access user profiles located any place accessible from communications network 414 (FIG. 4), including from websites (e.g., a social network website). In some embodiments, the media guidance application may also store user profiles on user equipment 402, 404, and 406 (FIG. 4), media guidance source 418 (FIG. 4), or any place accessible via the communications network 414 (FIG. 4).

Data field 1010 indicates to the media guidance application that the user's zip code is "10128." In some embodiments, the media guidance application may use this information to facilitate communication between users in the zip code "10128." Data field 1012 indicates to the media guidance application that communication is enabled. In some embodiments, the media guidance application may require communication to be enabled before facilitating communication between users.

Data field 1014 indicates to the media guidance application the media elements representative of a user associated with this user profile. In some embodiments, the media elements may be stored information, which is retrieved upon request by the media guidance application. For example, a camera or other suitable image capture device on user equipment 402, 404, and 406 (FIG. 4) may have previously captured an image for a media element and stored the media element on the user equipment. In some embodiments, the media elements may be located on, and retrieved from, any place accessible from communications network 414 (FIG. 4), including biography pictures on websites (e.g., a social network website). In some embodiments, the media guidance application may also store media elements on media guidance source 418 (FIG. 4) or any place accessible via the communications network 414 (FIG. 4).

Figure 13:
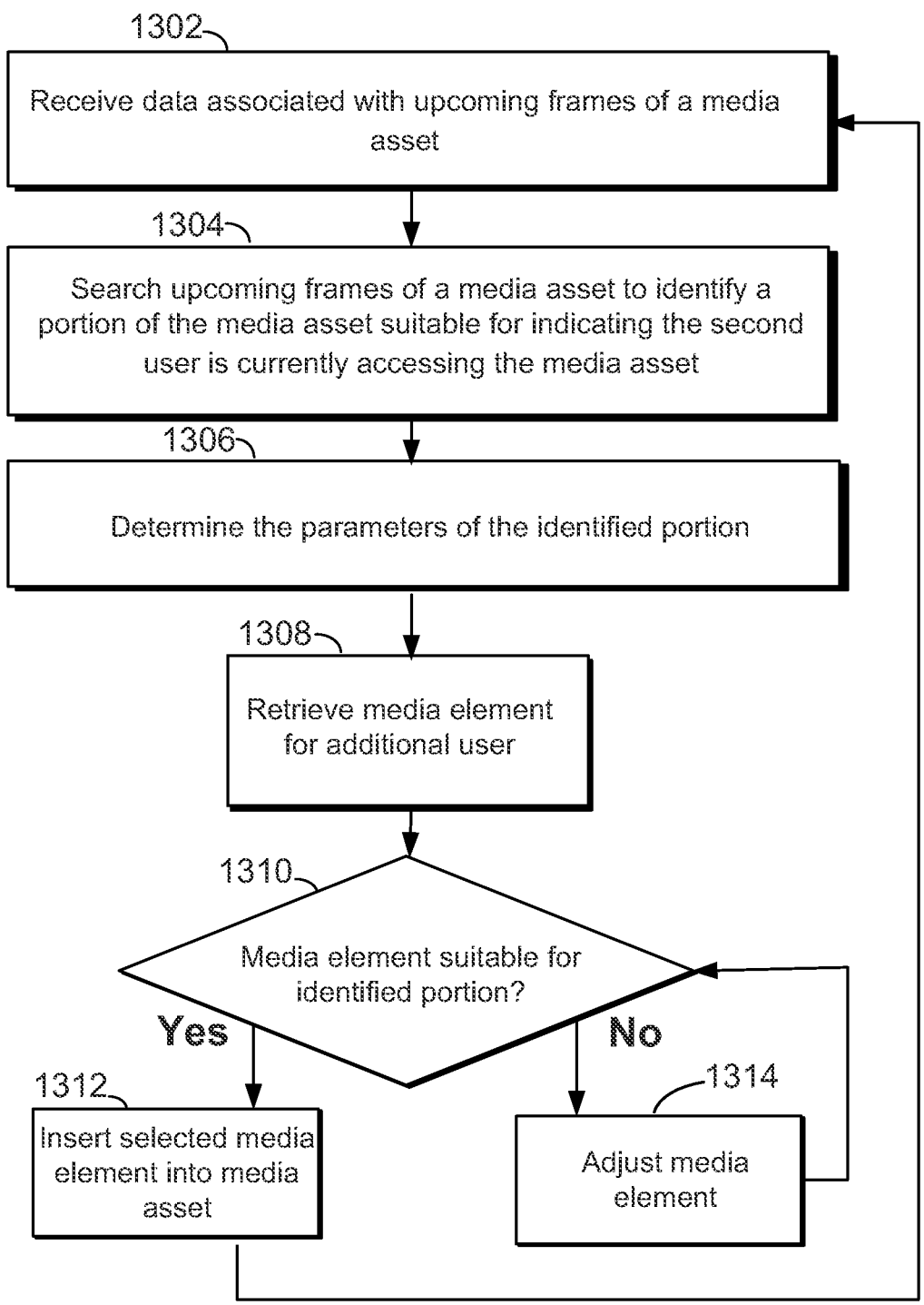
FIG. 13 is a flowchart of illustrative steps involved in inserting a selected media element in a media asset in accordance with some embodiments of the disclosure.

The media elements may contain textual, audio, video, or multimedia representations of the user. The media guidance application may also adjust the information retrieved from the media elements based on the portion of the media asset as described in relation to process 1300 (FIG. 13).

Data field 1016 indicates to the media guidance application to automatically open a line of communication (e.g., establish a telephone call or open a chat room) between the users during a commercial or other suitable point in the playback of the media asset. Data field 1018 indicates to the media guidance application that the user's favorite genre is "Crime Drama." In some embodiments, the media guidance application may use this information to facilitate communication between users favoring that genre.

Data field 1020 indicates to the media guidance application that the user has a high social media posting rate. This may indicate to the media guidance application the user is highly social and is likely a desirable person to communicate with. In some embodiments, the media guidance application may use this information when ranking users in relation to process 1100 (FIG. 11).

Data field 1022 indicates to the media guidance application the chat history associated with this user profile. For example, in some embodiments, the media guidance application may access chat histories associated with the user to determine other users that the user has previously communicated with. In some embodiments, the media guidance application may determine based on the chat history (e.g., whether or not the communication was brief) whether or not the users should be connected again. The chat histories may be located any place accessible from communications network 414 (FIG. 4), including from websites (e.g., a social network website). In some embodiments, the media guidance application may also store user profiles on user equipment 402, 404, and 406 (FIG. 4), media guidance source 418 (FIG. 4), or any place accessible via the communications network 414 (FIG. 4).

It should be noted that the data fields in array 1000 are illustrative only and not meant to be limiting. It is contemplated that additional, different, or fewer data fields, which may represent any other information found in a user profile, may also be included in some embodiments.

Figure 11:
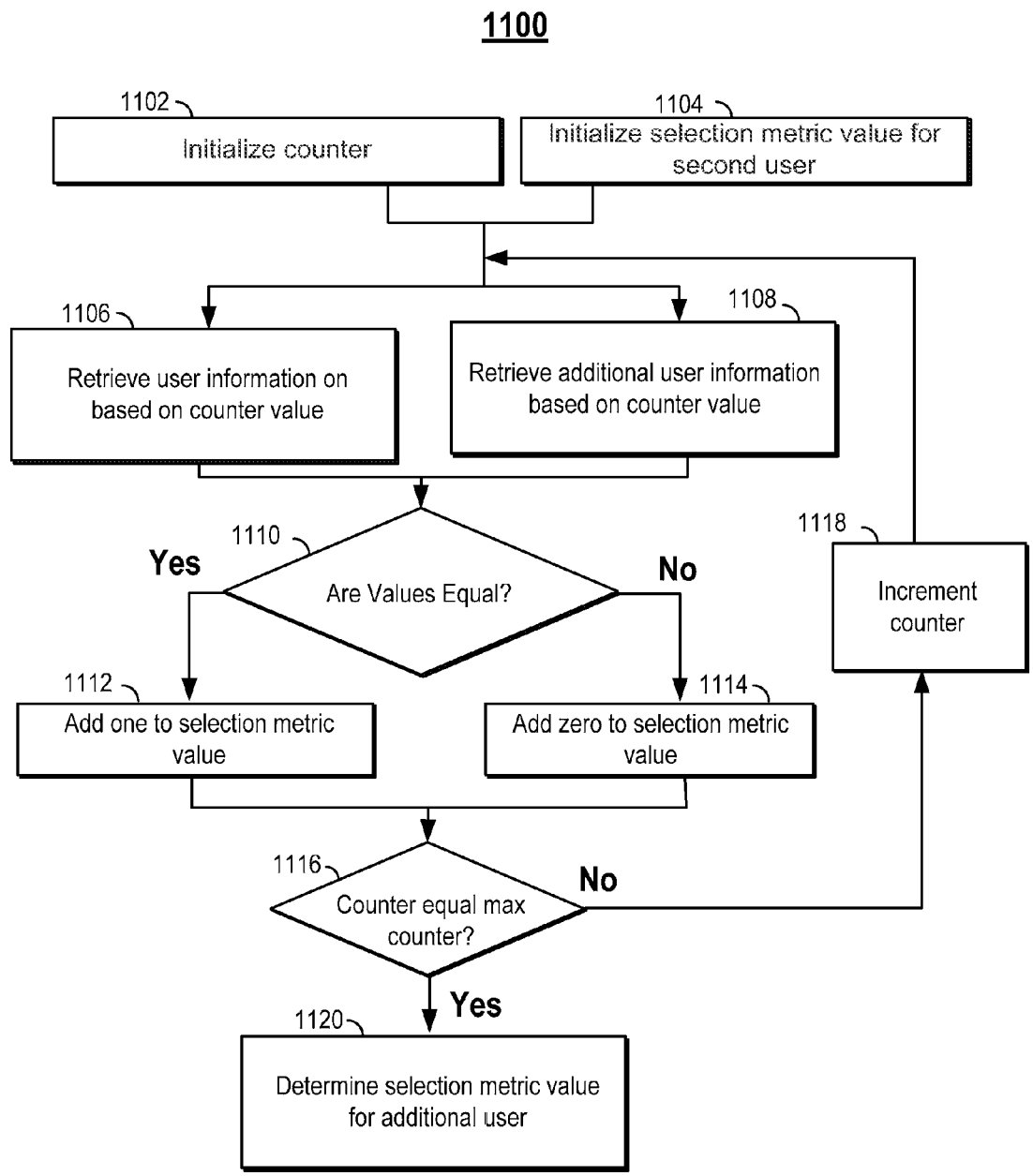
FIG. 11 is a flowchart of illustrative steps involved for determining a selection metric value for an additional user in accordance with some embodiments of the disclosure.
Figure 12:
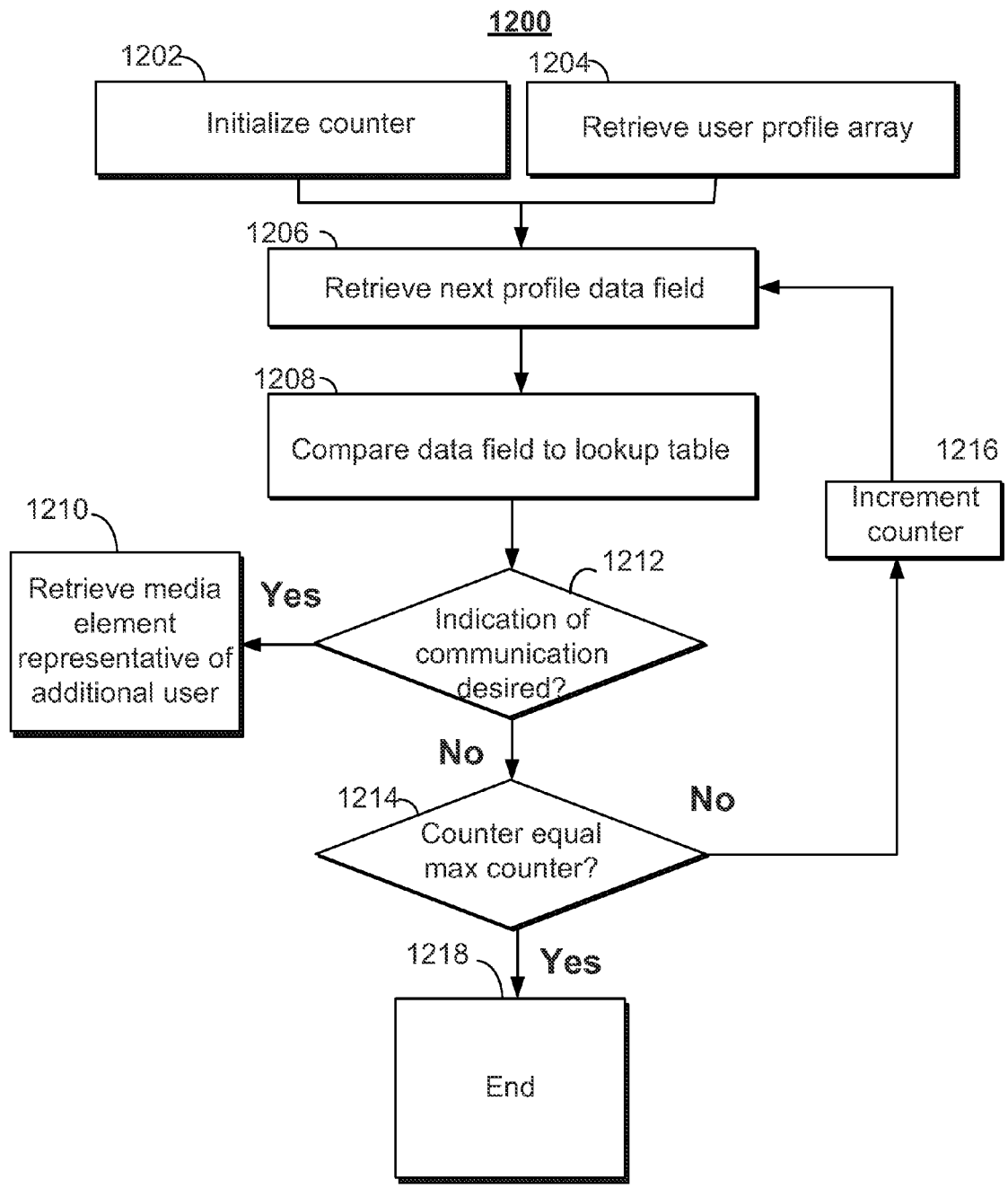
FIG. 12 is a flowchart of illustrative steps involved for comparing information in a user profile to a lookup table to determine whether or not the user desires to communication with another user in accordance with some embodiments of the disclosure.

FIG. 11 is a flowchart of illustrative steps involved for determining a selection metric value for an additional user in accordance with some embodiments of the disclosure. In some embodiments, the media guidance application may determine that multiple other users are accessing the same media asset as an initial user. In addition, there may be more users than identified portions (e.g., as identified in step 708 (FIG. 7)) in the media asset that are suitable for indicating other users are currently accessing the media guidance application. In some embodiments, the media guidance application may rank or prioritize the users for which media elements are selected to represent as discussed in step 710 (FIG. 7).

Process 1100 may be used to provide the displays, which facilitate communication, as shown in FIGS. 5A-D and 6A-C. It should be noted that process 1100, or any step thereof, could be displayed on, or provided by, any of the devices shown in FIGS. 3-4. For example, process 1100 may be executed by control circuitry 304 (FIG. 3) as instructed by the media guidance application.

In some embodiments, in order to rank the other users, the media guidance application may compare the initial user's user profile with the user profiles of the other users according to process 1100. In some embodiments, the media guidance application may generate a selection metric for each additional user. The value of the selection metric may be used to determine the ranking of each additional user. In some embodiments, the selection metric may be normalized, for example, expressed a number between one (e.g., indicating a low level of desirability to communicate) and one hundred (indicating a high level of desirability to communicate).

At step 1102, the media guidance application initializes the counter. At step 1104, the media guidance application initializes the selection metric value for the additional user. For example, the counter and selection metric value may be initialized by setting their values to one and zero, respectively. The counter will be used to track the progression of the media guidance application through the array of data fields of the user information (e.g., as shown in array 1000 (FIG. 10) to determine a selection metric for each additional user based on the user information of the initial user. The selection metric will be a value used to describe desirability of communication between two users.

At step 1106, the media guidance application retrieves the next data field of the user information based on the counter value. In some embodiments, the media guidance application may adjust the arrangement of data fields in the array of additional user information. For example, if the first data field of the initial user information includes data regarding the favorite show of the user, the data field corresponding to the favorite show of the additional user, if any, will be placed in the first data field of the additional user information array. The media guidance application will then compare the first data field (e.g., favorite show) of the initial user information to the corresponding data field (e.g., favorite show) from the additional user information.

At step 1108, the media guidance application retrieves a corresponding data field of array featuring the additional user's user information. At step 1110, the media guidance application compares the first data field of the initial user's user information and the corresponding data field of additional user's user information. The system may use multiple types of object recognition, including fuzzy logic as discussed above.

If the first data field of the initial user's user information equals the corresponding data field of the additional user's user information, the media guidance application adds a value to the selection metric at step 1112. If the first data field of the initial user's user information does not equal the corresponding data field of the additional user's user information, the media guidance application does not add a value to the selection metric at step 1114. In some embodiments, the amount of the value may be one. In some embodiments, the amount of the value may depend on the iteration (e.g., the particular counter number). For example, a particular counter number or data field may relate to a particular attribute that should be given more or less weight in the selection metric. For example, a data field indicating whether or not a user wishes to communicate (e.g., data field 1012) may be weighed more heavily than other data fields.

At step 1116, the media guidance application determines if the counter has reached its maximum value. If the counter has not reached the maximum value, the media guidance application continues to step 1118, which adds an increment to the counter, and returns to steps 1106 and 1108. If the counter has reached the maximum value, the media guidance application determines the value of the selection metric at step 1120. The value may then be used as an indicia of a desire to communicate (e.g., as discussed in relation to step 706 (FIG. 7)).

It should be noted that any of the devices or equipment discussed in relation to FIGS. 3-4 could be used to perform one of more of the steps in FIG. 11. It is also contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method.

FIG. 12 is a flowchart of illustrative steps involved for comparing information in a user profile to a lookup table to determine whether or not the user desires to communicate with another user in accordance with some embodiments of the disclosure. Process 1200 may be used to provide the displays, which facilitate communication, as shown in FIGS. 5A-D and 6A-C. It should be noted that process 1200 or any step thereof, could be displayed on, or provided by, any of the devices shown in FIGS. 3-4. For example, process 1200 may be executed by control circuitry 304 (FIG. 3) as instructed by the media guidance application.

Process 1200 describes some embodiments in which the media guidance application may search information associated with the first user and second user for indicia that the first user and the second user desire to communicate with each other. In some embodiments, the media guidance application may use process 1200 on each user profile associated with a user accessing the same media content as another user (e.g., as described in step 704 (FIG. 7). Process 1200 may process a user profile arranged in an array of data fields (e.g., array 1000). At step 1202, the media guidance application initializes a counter. In some embodiments, initializing a counter includes setting the value of the counter to one. The value of the counter corresponds to the data field currently being processed by the media guidance application.

At step 1204, the media guidance application retrieves a user profile array (e.g., array 1000). The user profile may be retrieved from content source 416, media guidance source 418, user equipment 402, 404, and 406 (FIG. 4), and/or any device accessible via communications network 414 (FIG. 4). The user profile may correspond to a user accessing a particular media asset (e.g., a first user as described in relation to step 702 (FIG. 7) and/or a second user as described in relation to step 704 (FIG. 7)).

At step 1206, the media guidance application retrieves the next data field in the user profile. In some embodiments, the data field may correspond to the counter value. For example, during the first iteration, the counter value may equal one. Therefore, the data field processed by the media guidance application is the first data field in the array (e.g., data field 1002 (FIG. 10) in array 1000 (FIG. 10)).

At step 1208, the media guidance application compares the value of the data field retrieved in step 1206 to lookup table of data field values. In some embodiments, the lookup table may assign numerical values to textual values found in the data field of the user profile. The numerical value may be used for determining a selection metric value as discussed in process 1100 (FIG. 11). The lookup table may be located on content source 416 (FIG. 4), media guidance source 418 (FIG. 4), user equipment 402, 404, and 406 (FIG. 4), and/or any device accessible via the communications network 414 (FIG. 4). For example, the media guidance application may examine each data field in the user profile for a data field that indicates the user associated with the user profile desires to communicate.

At step 1212, the media guidance application determines whether the data field indicates the user desires to communicate. For example, a data field may expressly indicate the user associated with the profile desires to communicate (e.g., data field 1012 (FIG. 10)) or may implicitly indicate the user associated with the user profile desires to communicate (e.g., data field 1020 (FIG. 10)). In each case, the media guidance application may compare the value in the data field to the value in the lookup table of values. Each value in the lookup table of values may be associated with an indication of whether or not the user desires to communicate. For example, a data field that indicates a user posts messages on a social network at a high rate (e.g., data field 1020 (FIG. 10)) may correspond to an indication, in the lookup table, that the user is highly social and is likely to desire to communicate.

If the media guidance application determines that the value in the data field indicates the user desires to communicate, the media guidance application retrieves a media element representative of additional user at step 1210. In some embodiments, step 1210 may correspond to step 710 (FIG. 7). If the media guidance application determines the value in the data field does not indicate the user desires to communicate or indicates the user does not desire to communicate, the media guidance application proceeds to step 1214.

At step 1214, the media guidance application determines if the counter has reached the maximum counter value. If the counter has not reached the maximum counter value, the media guidance application proceeds to step 1216. At step 1216, the counter value is increased (e.g., by one increment), and the media guidance application returns to step 1206. If the counter has reached the maximum counter value, the media guidance application proceeds to step 1218 and ends.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method.

FIG. 13 is a flowchart of illustrative steps involved in inserting a selected media element in a media asset in accordance with some embodiments of the disclosure. Process 1300 may be used to provide the displays, which facilitate communication, as shown in FIGS. 5A-D and 6A-C. It should be noted that process 1300 or any step thereof, could be displayed on, or provided by, any of the devices shown in FIGS. 3-4. For example, process 1300 may be executed by control circuitry 304 (FIG. 3) as instructed by the media guidance application.

At step 1302, the media guidance application receives data associated with upcoming frames of the media asset. For example, the media guidance application may receive the data from content source 416 (FIG. 4) or media guidance source 418 (FIG. 4) or from user equipment 402, 404, 406 (FIG. 4). In some embodiments, the data may be received in transmission files (e.g., transmission file 900 (FIG. 9)).

At step 1304, the media guidance application searches the upcoming frames of a media asset to identify a portion of the media asset suitable for indicating the second user is currently accessing the media asset. For example, in some embodiments, the media guidance application may interpret tags or chroma keyed elements found in the data associated with the media asset as discussed above. In some embodiments, the media guidance application may process the upcoming frames of the media asset using object recognition technology as discussed above. By interpreting tags and/or chroma keyed elements or by processing the upcoming frames of the media asset using object recognition technology, the media guidance application may determine possible locations for inserting media elements representative of users currently accessing the media asset as discussed above.

At step 1306, the media guidance application determines the parameters of the identified portion. For example, the media guidance application may determine that the identified portion will appear on the display screen (e.g., display screen 200 (FIG. 2)) of the user equipment of a particular user (e.g., user equipment 402, 404, and/or 406 (FIG. 4)) for a set amount of time. Moreover, the media guidance application may determine whether or not the portion will move during the progression of the media asset (e.g., as described in relation to media element 562 (FIG. 5D) above), and the boundaries of the movement relative to the display screen of the media asset. In some embodiments, the media guidance application may determine these parameters by interpreting tags and/or chroma keyed elements in upcoming frames of the media asset or by processing the upcoming frames of the media asset using object recognition technology as discussed above. For example, the media guidance application may search upcoming frames for tags and/or chroma keyed elements which correspond to the tags and/or chroma keyed elements of the identified portion.

At step 1308, the media guidance application retrieves a media element for an additional user. In some embodiments, the media element may be stored, or generated by, content source 416, media guidance source 418, user equipment 402, 404, 406 (FIG. 4) and/or any device accessible via communications network 414 (FIG. 4). For example, the media element may be associated with a user profile retrieved by the media guidance application. In another example, the media element may be created in real-time. In such cases, the generation of the media element may occur at the headend (e.g., content source 416 or media guidance source 418) or local on a user device (e.g., via an image capture device incorporated into user equipment 402, 404, 406 (FIG. 4).

At step 1310, the media guidance application determines whether or not the media element is suitable for the identified portion. For example, as the playback or broadcast of the media asset progresses the identified portion may alter its position, size, and/or orientation on the display screen of the user equipment. If the media element is suitable for the identified portion, the media guidance application inserts the media element into the media asset at step 1312 and returns to step 1302.

If the media element is not suitable for the identified portion (e.g., it is oriented in the wrong direction), the media guidance application adjusts the media element at step 1314. In some embodiments, adjusting the media element may involve modifying the position, size, orientation, shape, color, volume (e.g., if the media element is an audio cue), or any other characteristic needed to integrate the media element into the media asset. In some embodiments, the media guidance application may select a new media element, either for the same user or a different user, as the media asset progresses. For example, the media guidance application may periodically change the users displayed in the crowd of a televised baseball game. After the media element is adjusted, the media guidance application returns to step 1310.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method.

It should be noted that the above-described embodiments may be structured in a client-server or peer-to-peer implementation. For example, in a client-server implementation, the media guidance application may be implemented on a remote server (e.g., content source 416 (FIG. 4)). The remote server may receive data (e.g., a user indication as discussed in process 700 (FIG. 7), a media asset, a media element for insertion into a media asset, and/or an identified portion of a media asset) from one or more user devices (e.g., user equipment 402, 404, and/or 406 (FIG. 4) corresponding to one or more users), process the received data (e.g., as discussed in relation to FIGS. 7, 8, 11, 12, and/or 13), and transmit the processed data to back to the same, or another, user device. For example, the server may receive an indication of two users accessing the same media asset from two different user devices. The server may retrieve and insert media elements into respective instances of the media asset as displayed on the respective user devices, and transmit the modified media assets to the respective media devices.

In a peer-to-peer implementation, the media guidance application may be implemented on a first user equipment (e.g., user equipment 402, 404, and/or 406 (FIG. 4)). The first user equipment may receive data (e.g., a user indication as discussed in process 700 (FIG. 7), a media asset, a media element for insertion into a media asset, and/or an identified portion of a media asset) from the first user equipment, process the data (e.g., as discussed in relation to FIGS. 7, 8, 11, 12, and/or 13), and transmit the processed data to a second user equipment. For example, in some embodiments, each user device may receive an indication that another user is accessing the same media asset on another user device, each user device may then retrieve (e.g. from a local storage, remote location, and/or from the other device) a media element representative of the other user. The media guidance application on each user device may then identify a portion of the media asset for insertion of a media element into an instance of the media asset.

As stated above, it should be noted that the embodiments described in this disclosure may be structured in a hybrid client-server or peer-to-peer implementation. In such instances, one or more steps of FIGS. 7, 8, 11, 12, and/or 13 may be performed in part on user devices and in part on a remote server (or any device shown in FIG. 4). For example, the media guidance application may be implemented on a first user equipment (e.g., user equipment 402, 404, and/or 406 (FIG. 4)). The first user equipment may receive data (e.g., a user indication as discussed in process 700 (FIG. 7), a media asset, a media element for insertion into a media asset, and/or an identified portion of a media asset) from the first user equipment. The media guidance application on the first user equipment may process (e.g., as discussed in relation to FIGS. 7, 8, 11, 12, and/or 13) some of the data locally and transmit some of the data to a remote server (e.g., media guidance source 422 (FIG. 4)). The processed data may then be transmitted to a second user equipment from the first user equipment and the remote server.

For example, in some embodiments, a media guidance application on a remote server may receive a user indication that a user is accessing a media asset, and signal to a user device to retrieve a media element representative of the user. The media element may then be transmitted to the remote server for insertion into the media asset. The remote server may then transmit the modified media asset to the user device of another user to facilitate communication. In another example, in some embodiments, a media guidance application on a user device may receive a user indication that a user is accessing a media asset. The media guidance application on the user device may then signal a remote server to retrieve a media element representative of the user and insert it into a media asset. The remote server may then transmit the modified media asset to a user device of another user.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted, the systems and/or methods described above may be applied to, or used in accordance with, other systems and/or methods.

What is claimed is:

1. A method for enabling communication between users accessing a media asset using a media guidance application, the method comprising:
   receiving a first indication that a first user is accessing a media asset on first user equipment, wherein the media asset includes an in-focus object and an out-of-focus object;
   receiving a second indication that a second user is accessing the media asset on second user equipment;
   searching a database of user information for indicia indicating that the first user and the second user are likely to desire to communicate with each other;
   in response to locating said indicia, identifying a portion of the media asset corresponding to the out-of-focus object suitable for indicating to the first user that the second user is currently accessing the media asset;
   selecting a media element representative of the second user; and
   inserting the selected media element at the identified portion of the media asset being accessed by the first user on the first user equipment.

2. The method of claim 1, further comprising receiving a request from the first user to communicate with the second user.

3. The method of claim 2, further comprising receiving a communication from a first user at a first user equipment and transmitting the communication to a second user at a second user equipment.

4. The method of claim 1, further comprising inserting the selected media element at the identified portion of the media asset using chroma key compositing.

5. The method of claim 1, further comprising identifying the portion of the media asset suitable for inserting the selected media element based on metadata received with the media asset.

6. The method of claim 1, wherein the database of user information includes first user information associated with the first user.

7. The method of claim 1, further comprising ranking the indicia indicating that the first user and second user desire to communicate with each other about the media asset and indicia indicating that the first user and a third user desire to communicate with each other about the media asset.

8. The method of claim 1, further comprising adjusting the size, shape, orientation, or position of the media element representative of the second user based on the identified portion as the media asset progresses.

9. The method of claim 1, further comprising generating the media element representative of the second user in real-time using a camera incorporated into the second user equipment.

10. The method of claim 1, wherein inserting the selected media element comprises overlaying the identified portion with the media element.

11. A system for enabling communication between users accessing a media asset, the system comprising control circuitry configured to:
   receive a first indication that a first user is accessing a media asset on first user equipment and receive a second indication that a second user is accessing the media asset on second user equipment, wherein the media asset includes an in-focus object and an out-of-focus object;
   search a database for indicia indicating that the first user and the second user likely desire to communicate with each other;
   in response to locating said indicia, identify a portion of the media asset corresponding to the out-of-focus object suitable for indicating the second user is currently accessing the media asset; and
   select a media element representative of the second user; and
   insert the selected media element at the identified portion of the media asset being accessed by the first user equipment.

12. The system of claim 11, wherein the control circuitry is further configured to receive a request from the first user to communicate with the second user.

13. The system of claim 12, wherein the control circuitry is further configured to receive a communication from a first user at a first user equipment and transmit the communication to a second user at a second user equipment.

14. The system of claim 11, wherein the control circuitry is further configured to insert the selected media element at the identified portion of the media asset using chroma key compositing.

15. The system of claim 11, wherein the control circuitry is further configured to identify the portion of the media asset suitable for inserting the selected media element based on metadata received with the media asset.

16. The system of claim 11, wherein the database of user information includes first user information associated with the first user.

17. The system of claim 11, wherein the control circuitry is further configured to rank the indicia indicating that the first user and second user desire to communicate with each other about the media asset and indicia indicating that the first user and a third user desire to communicate with each other about the media asset.

18. The system of claim 11, wherein the control circuitry is further configured to generate the media element representative of the second user in real-time using a camera incorporated into the second user equipment.

19. The system of claim 11, wherein the control circuitry is further configured to generate the media element representative of the second user.

20. The system of claim 11, wherein the control circuitry is further configured to insert the selected media element comprises overlaying the identified portion with the media element.

* * * * *